(12) United States Patent
Baker

(10) Patent No.: US 8,827,234 B2
(45) Date of Patent: Sep. 9, 2014

(54) ONE-HANDED, BACK-BASED SUPPORT FOR A HAND-HELD OBJECT

(75) Inventor: Gerald Hank William Baker, Central Hong Kong (CN)

(73) Assignee: One Hand Clapping Ltd., Tortola (VG)

( * ) Notice: Subject to any disclaimer, the term of this patent is extended or adjusted under 35 U.S.C. 154(b) by 154 days.

(21) Appl. No.: 13/274,124

(22) Filed: Oct. 14, 2011

(65) Prior Publication Data

US 2012/0091312 A1    Apr. 19, 2012

Related U.S. Application Data

(60) Provisional application No. 61/393,271, filed on Oct. 14, 2010.

(51) Int. Cl.

| | |
|---|---|
| *G06F 1/16* | (2006.01) |
| *A45F 5/00* | (2006.01) |
| *F16M 13/00* | (2006.01) |
| *F16M 13/04* | (2006.01) |
| *H04M 1/04* | (2006.01) |

(52) U.S. Cl.
CPC ........ *F16M 13/00* (2013.01); *A45F 2200/0525* (2013.01); *G06F 1/163* (2013.01); *H04M 1/04* (2013.01); *A45F 2005/008* (2013.01); *G06F 1/1626* (2013.01); *F16M 13/04* (2013.01)
USPC .......... 248/682; 224/218; 224/250; D14/250; D14/447

(58) Field of Classification Search
CPC ............ F16M 13/04; A45F 5/00; B43L 15/00
USPC ......... 248/682, 491; 211/41.1, 41.2; 224/218, 224/217, 250; 294/152, 156, 157; D14/250, D14/447
See application file for complete search history.

(56) References Cited

U.S. PATENT DOCUMENTS

| | | | |
|---|---|---|---|
| 656,431 A | 8/1900 | Stewart | |
| 1,243,232 A | 8/1917 | Taggart | |
| 1,583,343 A | 5/1926 | Duerden | 24/129 R |
| 2,099,199 A | 11/1937 | Devendor et al. | |
| 2,825,952 A | 3/1958 | Van Driel | |
| 2,876,022 A | 3/1959 | Kroviak | 281/44 |
| 3,214,072 A * | 10/1965 | Brown | 294/152 |
| 3,520,004 A | 7/1970 | Patnaude | |

(Continued)

FOREIGN PATENT DOCUMENTS

GB    2479903 A    *    11/2011

OTHER PUBLICATIONS

Biggs, J. "FreeOneHand iPad Holder and Stand: Simply Grip the Rod," CrunchGear, URL=http://www.crunchgear.com/2010/11/23/freeonehand-ipad-holder-and-stand-simply-grip-the-rod/, dated Nov. 23, 2010, download date Apr. 8, 2011, 2 pages.

(Continued)

*Primary Examiner* — Anita M King
(74) *Attorney, Agent, or Firm* — Seed IP Law Group PLLC

(57) ABSTRACT

The present disclosure is directed to a protective support device that includes a planar unitary elastomeric body having a central portion and at least two end segments extending from the central portion, each end segment having an opening formed therein, each opening structured to engage with opposing corners of a tablet computer.

15 Claims, 27 Drawing Sheets

(56) References Cited

U.S. PATENT DOCUMENTS

| | | | |
|---|---|---|---|
| 3,653,100 A | 4/1972 | Dolan | |
| 3,701,559 A * | 10/1972 | Marino et al. | 294/74 |
| 4,020,527 A | 5/1977 | O'Neill | 16/110 R |
| D267,909 S | 2/1983 | Fildan | |
| 4,395,057 A | 7/1983 | Young | 281/42 |
| 4,470,180 A | 9/1984 | Blomgren | |
| 4,553,780 A * | 11/1985 | Strachan | 294/152 |
| 4,988,229 A | 1/1991 | Ramsey, III | 402/4 |
| 5,007,141 A | 4/1991 | Gentes | |
| 5,075,926 A | 12/1991 | Jeong | 16/115 |
| D334,883 S | 4/1993 | Fraker et al. | |
| 5,249,337 A | 10/1993 | Cross et al. | |
| 5,417,456 A | 5/1995 | Laubacher | 281/45 |
| 5,456,497 A | 10/1995 | Ross, Jr. | 281/42 |
| 5,463,797 A | 11/1995 | Laug et al. | |
| 5,833,292 A * | 11/1998 | Lyons, Jr. | 294/152 |
| 6,102,462 A * | 8/2000 | Fields | 294/152 |
| D452,138 S | 12/2001 | Murata | |
| D455,348 S | 4/2002 | Fludd | D9/455 |
| D463,279 S | 9/2002 | Piazza | D9/434 |
| D471,132 S | 3/2003 | Murata | |
| 6,616,111 B1 | 9/2003 | White | 248/309.1 |
| 6,672,621 B1 | 1/2004 | Moss | 281/36 |
| 6,693,367 B1 | 2/2004 | Schmeisser et al. | 307/9.1 |
| 6,781,825 B2 | 8/2004 | Shih et al. | 361/683 |
| 6,967,836 B2 | 11/2005 | Huang et al. | 361/687 |
| 6,999,797 B2 | 2/2006 | Crawford et al. | 455/564 |
| 7,237,756 B2 | 7/2007 | Isenberg | 248/451 |
| 7,274,564 B2 | 9/2007 | Rossini | 361/686 |
| 7,307,620 B2 | 12/2007 | Siddeeq | 345/169 |
| 7,359,184 B2 | 4/2008 | Lord | 361/683 |
| 7,651,029 B1 | 1/2010 | Mangaroo et al. | 235/462.45 |
| D614,652 S | 4/2010 | Arnell | |
| D618,094 S | 6/2010 | Arnell | |
| 7,790,829 B2 * | 9/2010 | Srikanth et al. | 528/32 |
| D625,654 S | 10/2010 | Spater | |
| D634,191 S | 3/2011 | Arnell | |
| 7,938,260 B2 * | 5/2011 | Lin | 206/320 |
| D657,564 S | 4/2012 | Baker | |
| D673,162 S * | 12/2012 | Young | D14/447 |
| D679,693 S * | 4/2013 | Rashid | D14/250 |
| 2004/0025993 A1* | 2/2004 | Russell | 150/154 |
| 2004/0069823 A1* | 4/2004 | Condiff | 224/269 |
| 2004/0226973 A1 | 11/2004 | Kao | 224/218 |
| 2005/0257341 A1 | 11/2005 | Chen et al. | 16/17.1 |
| 2007/0051766 A1 | 3/2007 | Spencer | 224/607 |
| 2007/0205236 A1* | 9/2007 | Partusch | 224/250 |
| 2010/0294908 A1* | 11/2010 | Mish et al. | 248/451 |
| 2011/0303709 A1* | 12/2011 | Wizikowski | 224/218 |
| 2012/0200102 A1* | 8/2012 | McMeans | 294/149 |

OTHER PUBLICATIONS

Cideko Beyond Digital, Transformer for Convenient and Simple Use, URL=http://www.cideko.com/pro_con.php?id=16, download date Nov. 9, 2010, 2 pages.
ColorWare, Grip for iPad, URL=http://www.colorwarepc.com/p-248-grip.aspx, download date Apr. 8, 2011, 2 pages.
FreeOneHand iPad Holder & Stand, URL=http://www.freeonehand.com/, download date Apr. 8, 2011, 1 page.
Grabbit, get a grip on your iPad, URL=http://ipad-grabbit.weebly.com/, download date Nov. 9, 2010, 4 pages.
Griffin Technology: AirStrap—The case that makes it easy to hold your iPad, URL=http://www.griffintechnology.com/products/airstrap, download date Apr. 8, 2011, 3 pages.
Hand e-holder, URL=http://www.handeholder.com/3.html, download date Apr. 8, 2011, 3 pages.
HeloStrap, Securely Mobile, URL=http://www.helostrap.com/, download date Apr. 8, 2011, 1 page.
IDrop Makes your Tablet Hands free, URL=http://www.myidrop.com/, download date Apr. 8, 2011, 2 pages.
iPad Strap: The Pad Strap for iPad and iPad 2, URL=http://www.thepadstrap.com/, download date Apr. 8, 2011, 4 pages.
J. Biggs, Techcrunch.com; "FreeOneHand iPad Holder And Stand: Simply Grip the Rod," URL=http://techcrunch.com/2010/11/23/freeonehand-ipad-holder-and-stand-simply-grip-the-rod/, Nov. 23, 2010, 3 pages.
N. Gravley, MacObserver.com; "Onhand X-Band for The iPad—Hold Your iPad With One Hand," URL=http://www.macobserver.com/tmo/review/onhand_x-band_for_the_ipad_-_hold_your_ipad_with_one_hand/, Jun. 18, 2010, 3 pages.
TabGrip, URL=http://www.tabgrip.com/Photo_Gallery.php, download date Apr. 8, 2011, 1 page.
The HandStand iPad Holder, URL=http://www.thehandstand.com/, download date Apr. 8, 2011, 2 pages.
TIETCO, iPad Hands Free Accessories, MyClip, URL=http://www.tietco.com/index.html, download date Nov. 9, 2010, 2 pages.
TKO Solutions, X-Band and Onhand iPad Gloves, URL=http://tko-solutions.com/cowbell/, download date Nov. 9, 2010, 1 page.
Tuaw, iPad presentation holder, URL=http://www.tuaw.com/photos/ipad-presentation-holder/, download date Nov. 9, 2010, 2 pages.
Tuaw, iPad presentation holder, URL=http://www.tuaw.com/photos/ipad-presentation-holder/, download date Nov. 3, 2011, 2 pages.
E. Sadun, Tuaw.com; "Voices that Matter iPhone: One-handed iPad holder," <http://www.tuaw.com/2010/04/24/voices-that-matter-iphone-one-handed-ipad-holder/>, 5 pages, Apr. 24, 2010.
N. Gravley, MacObserver.com; "Onhand X-Band for The iPad—Hold Your iPad With One Hand," <http://www.macobserver.com/tmo/review/onhand_x-band_for_the_ipad_-hold_your_ipad_with_one_hand/>, 3 pages, Jun. 18, 2010.
J. Biggs, Techcrunch.com; "FreeOneHand iPad Holder And Stand: Simply Grip The Rod," <http://techcrunch.com/2010/11/23/freeonehand-ipad-holder-and-stand-simply-grip-the-rod/>, 3 pages, Nov. 23, 2010.
myiDrop.com; "myiDrop.com Launch Commercial #1," <http://www.youtube.com/watch?v=oFskffArGMA>, 2 pages, Nov. 10, 2010.
Griffin Technology Press Release; "Griffin Technology Announces New Fall Collection for iPad," <http://www.griffintechnology.com/press/release/griffin-technology-announces-new-fall-collection-ipad>, 2 pages, Oct. 12, 2010.
The Street Press Release; "Wizski Industries Launches "HeloStrap" For IPad," <http:www.thesteet.com/print/story/10930882.html>, 2 pages, Nov. 23, 2010.
The Bachelor Guy; "The Ultimate Techie Gear and Gadget Gift Guide," <http://www.thebachelorguy.com/the-ultimate-techie-gear-and-gadget-gift-guide.html>, 8 pages, Dec. 22, 2010.
Belkin International, Inc. Press Release; "Your iPad, Your Way: Belkin Introduces FlipBlade™ & Grip 360°+Stand," <http://www.belkin.com/pressroom/releases/uploads/ipadstands_110210.html>, 4 pages, Nov. 2, 2010.
HandECinch.com; <http://www.handecinch.com>, 4 pages, domain name created Jun. 30, 2011.

* cited by examiner

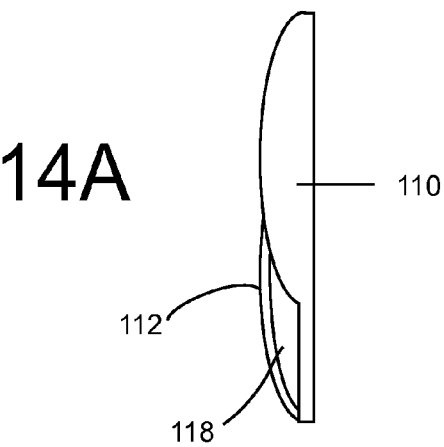
FIG 14A
FIG 14B
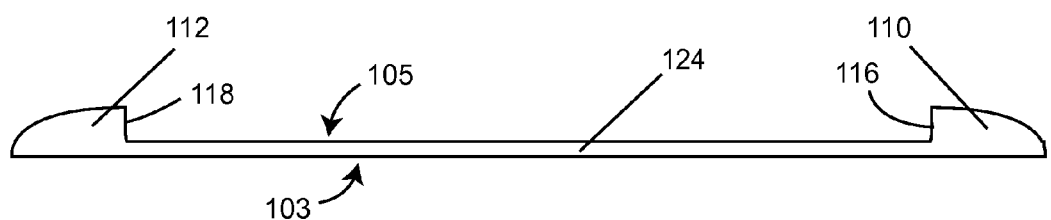
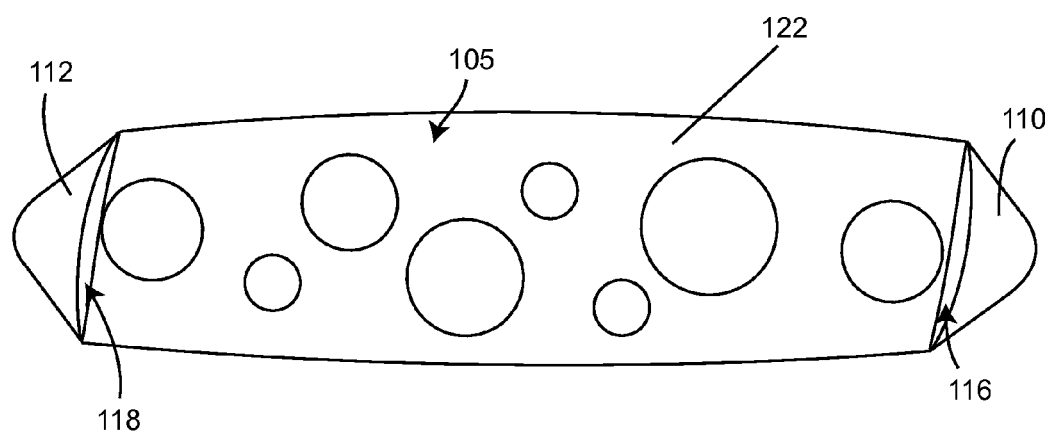
FIG 14C

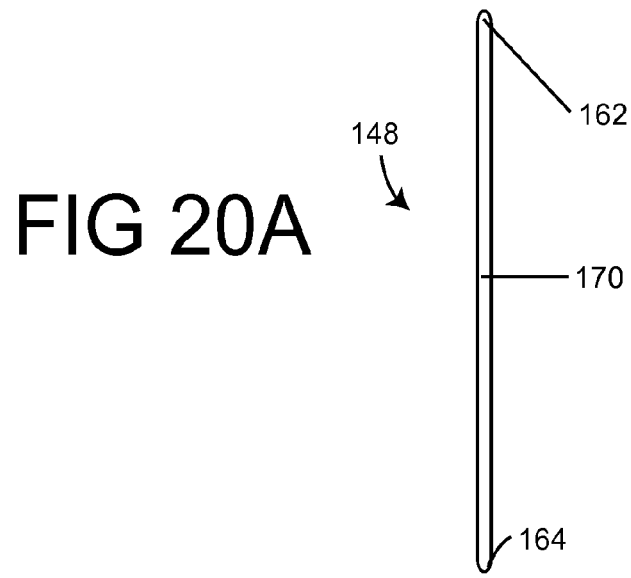
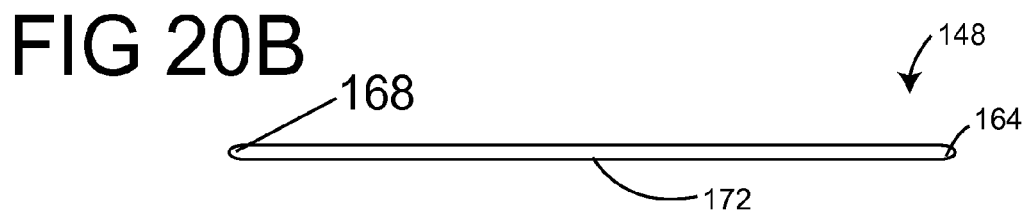
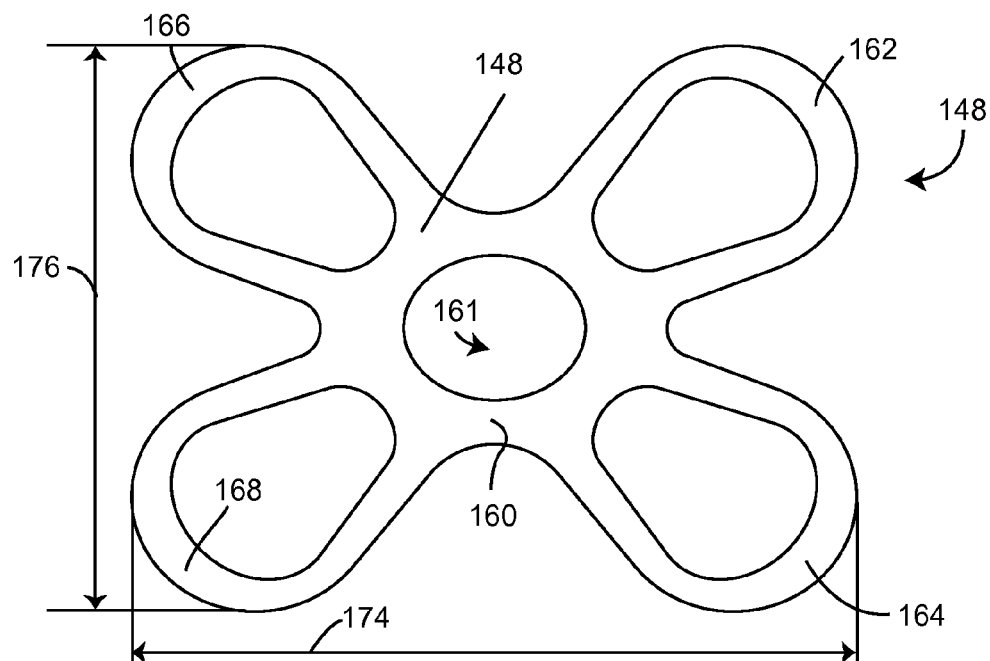

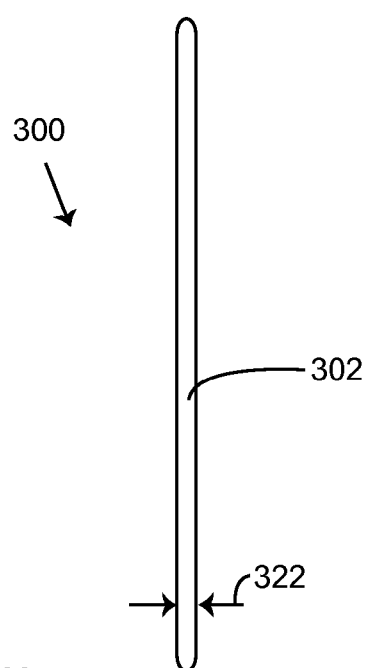
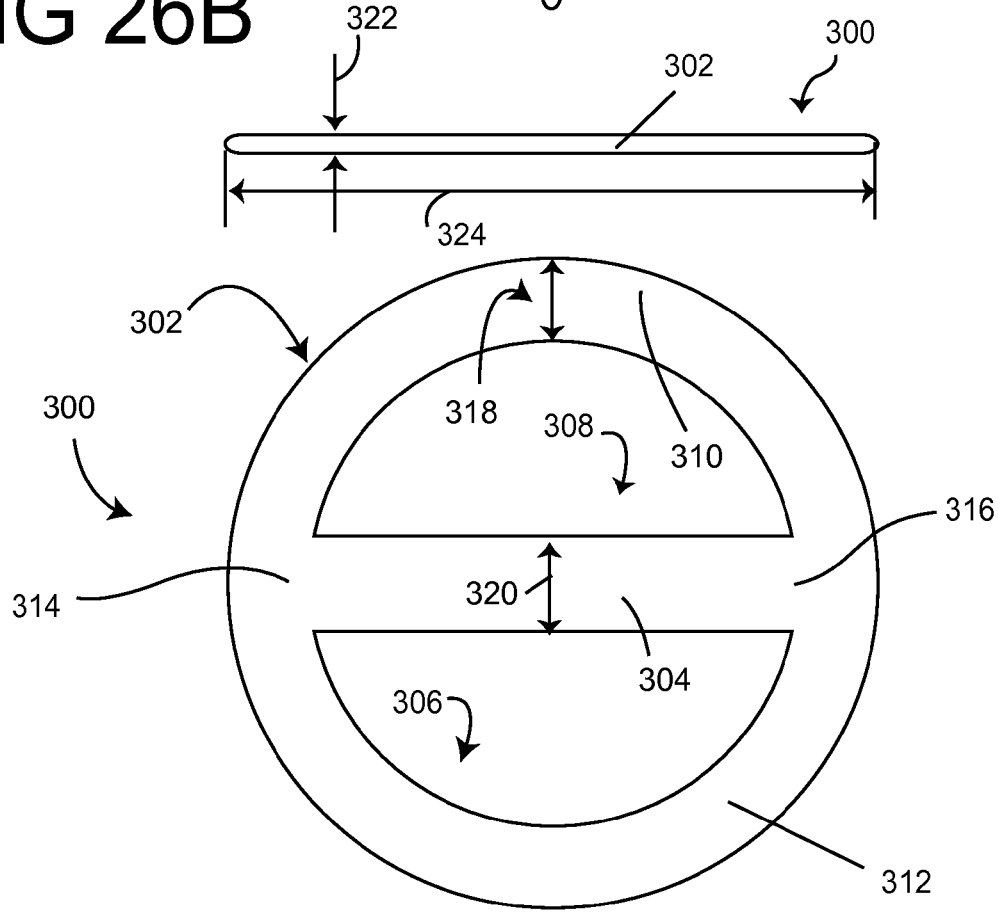

ONE-HANDED, BACK-BASED SUPPORT FOR A HAND-HELD OBJECT

BACKGROUND

1. Technical Field

The present disclosure relates generally to support systems and, more specifically, to a device for supporting a hand-held object, such as a tablet computer by way of a back-based two-cornered attachment system for single hand operation.

2. Description of the Related Art

The present disclosure closes a specific gap in the art affecting a category of electronic devices generically known as "tablet PCs" (hereinafter "tablets"). Tablets occupy a middle ground between two categories of devices commonly known as laptops and notebooks (hereinafter "laptops"), on the one hand, and handheld devices such as Personal Digital Assistants and "smart phones" (hereinafter referred to collectively as "PDAs"), on the other.

PDAs can be held easily in one hand. Laptops, being larger and heavier than PDAs or tablets, need to be supported from underneath and typically require two hands to operate. Laptops have a hinged configuration that couples a screen to motherboard and keyboard portion. The keyboard and motherboard portion are supported from underneath, which is usually provided by a solid, flat surface such as a table or desk, or as the name implies, one's "lap" or thigh area. When a laptop is in use on a surface such as a table or one's lap, the screen is vertical—perpendicular to the keyboard and to the table's surface. In this position the user is looking directly at the screen in much the same way one looks at a television.

Tablets cannot be held and operated in the same manner as PDAs because of their larger size and weight. Yet because they are appreciably smaller and lighter than laptops, tablets need not be restricted to a surface such as one's lap in order to be utilized. In addition, many tablet applications require only one hand. However, due to the lack of a suitable support system for tablets, they are, by and large, used in the same manner as laptops. There does not exist a secure, reliable way to hold a tablet from its back with one hand so that the user can take full advantage of the tablet's added portability.

There are many different makes and models of tablets, for such devices have been on the market for years. However, even though tablets are specifically designed to be highly portable, few take advantage of this potential given the absence of a device that enables one to adequately hold a tablet in one hand and operate it with the other.

When in use on a table, the tablet sits generally flat or horizontal on the table's surface. One must either hunch over the tablet in its flat, horizontal position, or tilt or raise the tablet up to a more vertical attitude, to view the screen. Holding the tablet in this way creates two problems. The first is that the hand holding the device is prone to interfere with the front of the screen. The second is that there is not a secure, comfortable way to hold the tablet in this position for prolonged periods. Stands have been devised to remedy this problem. However, even a stand requires a flat surface upon which to rest.

Apple Inc.'s popular tablet, the "iPad" tablet, is a prime example of a tablet in need of a back-based, one-handed support system. The "iPad" tablet has a rounded back made of smooth aluminum. While the tablet will lie comfortably in the palm of one's hand, a user cannot confidently raise the tablet up to eye level from horizontal to vertical without having the tablet at risk of sliding out of one's hand. In a vertical attitude the only way to hold the tablet is to reach one's thumb around the edge and grip a part of the front surface or touch-screen. It is nearly impossible for a user to hold the tablet vertically with one hand without having that hand interfere with the front touch-screen operations.

Moreover, underside support is not available when a user seeks to use the tablet while standing, walking, sitting, or reclining. In such positions the user cannot securely hold the tablet in one hand while operating the device with the other. For example, if the user holds the tablet by its outer edge to avoid interfering with the touch-screen front surface, the user is at great risk of dropping the device. But, if the user grips the tablet securely, the user is at risk of interfering with the touch-screen surface. Not being able to hold a tablet from its back alone greatly restricts and diminishes the manner in which a tablet can be used.

BRIEF SUMMARY

One embodiment of the present disclosure is a protective support device that includes a planar unitary elastomeric body having a central portion and at least two end segments extending from the central portion, each end segment having an opening formed therein, each opening structured to engage with opposing corners of a hand holdable or hand-held object, such as a tablet computer. The at least two end segments include a first end segment extending in a first direction from the central portion and a second end segment extending from the central portion in a second direction opposite to the first direction, the first direction and the second direction extending in a single plane. The elastomeric body is formed from a silicone elastomer that can have a tensile strength in the range of 7 and 8 megapascals. Ideally, the body is structured to stretch in all directions so that the end segments can extend in longitudinal length so the openings can engage the opposing corners of the object. This stretching can include expanding or increasing a circumference of the opening in each of the end segments.

The body has a first surface and an opposing second surface that ideally is parallel to the first surface, and the body is configured to expand and contract between an engaged configuration in which the openings are engaged with a respective corner of the object and a disengaged configuration in which the openings are not engaged with a respective corner of the object. The first surface is configured to contact a front surface of the object, such as a display screen of the tablet computer, and to contact a back surface of the object when the body is in the engaged configuration. More preferably, the first surface of the body, when in the engaged configuration, is in contact with the front surface of the object at an apex of the first and second end segments and the first surface is in contact with the back surface of the object at the central portion of the device.

In an alternative embodiment of the present disclosure, a protective support device is provided that has an elastomeric body formed from a compliant material. The body includes a first curved end extending between a first connection and a second connection, the first curved end configured to engage with a first corner of a tablet computer, and the first curved end delimiting a portion of a first opening. The body includes a first central member, which extends between the first connection and the second connection, and a second curved end, which extends between the first connection and the second connection, the second curved end configured to engage with a second corner of the tablet computer, and the second curved end delimiting a portion of a second opening.

The body further includes a second central member adjacent to the first central member and extending between the first connection and the second connection, the first and second central members cooperating to delimit a third opening. The first curved end and the first central member are configured to delimit the first opening and the second curved end and the second central member are configured to delimit the second opening. The first and second curved ends have a first elasticity and the first and second connections have a second elasticity that is less than the first elasticity, the first elasticity is configured to enable the first and second curved ends to stretch and engage with the first and second corners of the tablet computer.

In another embodiment, a method is provided that includes positioning a first curved end of a unitary elastomeric body over a first corner of an object, such as a tablet computer, and positioning a second curved end of the body over a second corner of the object by stretching the body so that first and second openings in the first and second curved ends, respectively, engage opposing corners of the object, a first surface of the body at the first and second curved ends being in contact with a display of the tablet computer and a central portion of the body being in contact with a back surface of the tablet computer.

One embodiment of the present disclosure is directed to a protective support system having a central portion and at least two elastomeric end segments extending from the central portion, each end having an opening positioned away from the central portion, the openings configured to engage with opposing corners of an object, such as a tablet computer, when the end segments are stretched to engage openings in the end segments over the corners.

One embodiment of the present disclosure is directed to a device and method for supporting a portable object, such as electronic readers, like the Amazon "Kindle" reader, with one hand while leaving the other hand available to operate the object. The device is lightweight, economical, and easy to install. The device is structured to enable a user to hold the object from its back with one hand in a secure and reliable manner.

In accordance with a further aspect of the present disclosure, the device disclosed herein is preferably constructed of a strong but pliable material of sufficient elasticity that, when stretched, can be anchored on and attached to two opposing corners of a hand-held planar object. A portion of the material that runs or is stretched across the back of the object between these two corners provides a gripping surface by which a user can place their hand between the object and the gripping surface of the device to enable holding of the object. This device can also provide additional features such as cut outs or openings in the body that can be utilized as "purchase points" in which the user can insert parts of a hand, fingers, or tips of fingers. These purchase points also provide openings through which the user can insert everyday household items to enable the propping upon, or mounting of the object to, various surfaces. Alternatively, a user can insert his/her entire hand or portions of a hand between the device and the back surface of the object. The resilient force of the device securely holds the object to the palmar surface of the user's hand. The device serves the additional purposes of aiding in the protection of the front and back surfaces of the object as described more fully herein.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein:

FIGS. 14A-14C are top and side views of the device of FIG. 13.

FIGS. 20A-20C are top and side views of the device of FIG. 19.

FIGS. 26A-26C are top and side views of a protective support device according to an alternative embodiment of the present disclosure.

DETAILED DESCRIPTION

Figure 1:
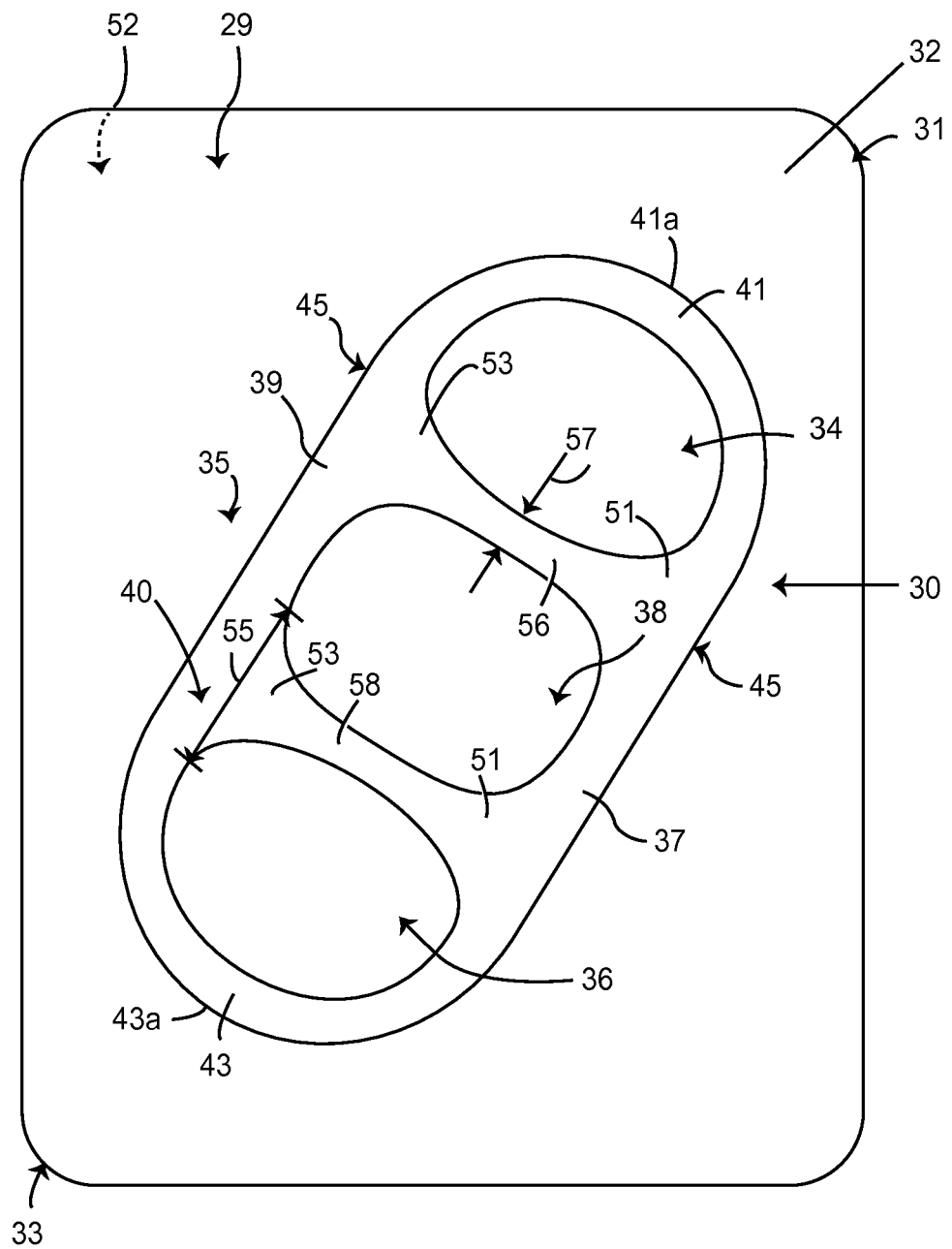
FIG. 1 is a plan view of a protective support device resting on a back surface of a tablet in accordance with an embodiment of the present disclosure.

In the following description, certain specific details are set forth in order to provide a thorough understanding of various embodiments of the disclosure. However, one skilled in the art will understand that the disclosure may be practiced without these specific details. In other instances, well-known structures associated with manufacturing techniques have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and appended claims, the terms "correspond," "corresponds," and "corresponding" are intended to describe a ratio of or a similarity between referenced objects. The use of "correspond" or one of its forms should not be construed to mean the exact shape or size.

In the drawings, identical reference numbers identify similar elements or acts. The size and relative positions of elements in the drawings are not necessarily drawn to scale.

As shown in FIG. 1, a first embodiment of a support system is shown in the form of a protective support device 30 that consists of a substantially flat piece of elongate elastomeric material. The device 30 is configured to be stretched repeatedly for easy installation, use, and removal from a hand holdable or hand-held object 32. The elastomeric properties allow the device to return to a resting state when not attached to the object. Ideally the material can be stretched in all directions an equal amount. The device 30 has a first surface 40 and a second surface 42 (see FIGS. 2A and 2B), where the first and second surfaces 40, 42 are ideally mutually opposing planar surfaces. The device 30 has a thickness, shown by dimension line 44 in FIG. 2A, in the range of 0.2 cm to 0.6 cm that defines a circumscribing outside edge or side wall 45. In use, the second surface 42 of the device 30 is urged against a back surface 29 of the object 32.

The protective support device 30 is designed for use with the hand-held object 32, such as, without limitation, a tablet-style computer, an electronic hand-held device, an electronic book or document reader (an "e-reader"), or other planform shaped object whether electronic or not. Generally, these objects will include a smooth solid inactive back surface 29 and a front surface 52 that is a display with or without a keyboard, a touch-screen interface, or other type of surface that can be viewed or otherwise interacted with by a user.

In the embodiments shown and described in the Figures, the object 32 is a tablet computer and will be referred to throughout as a "tablet." The back surface 29 of the tablet 32 is a smooth planar metal or plastic surface that includes no features to assist in holding the tablet 32. The front surface 52 of the tablet 32 includes a border 60 and an active touch-screen 63, see FIG. 6A. The border 60 is generally inactive and can be formed of the same material as the back surface 29 of the tablet 32. In some embodiments, the border 60 is a consistent width around the active touch-screen 63. However, in other embodiments the border 60 is wider on one or more ends to accommodate a key board or other input mechanisms, such as buttons or female input receptacles.

The device 30 is configured to attach to at least two corners of the tablet 32 to simultaneously provide protection for the front surface 52 and a support or handle adjacent to the back surface 29. As mentioned above, the support device 30 is composed of firm but elastomeric material, which allows a user to easily attach the device 30 to the tablet 32 while providing sufficient tension to hold the tablet comfortably to or with a single hand. The device 30 is applied to the tablet 32 by engaging two or more corners 31, 33 of the tablet 32 with ends of the device 30.

There are three distinct openings in the device 30. First and second openings 34, 36 are designed to stretch and slip over opposite first and second corners 31, 33 of the tablet 32, and they are retained in place by the tension exerted thereon by the resilient material of the device 30. A third, middle opening 38 is the primary area to be engaged with the hand and fingers when the device 30 is secured to the tablet 32.

Figure 3:
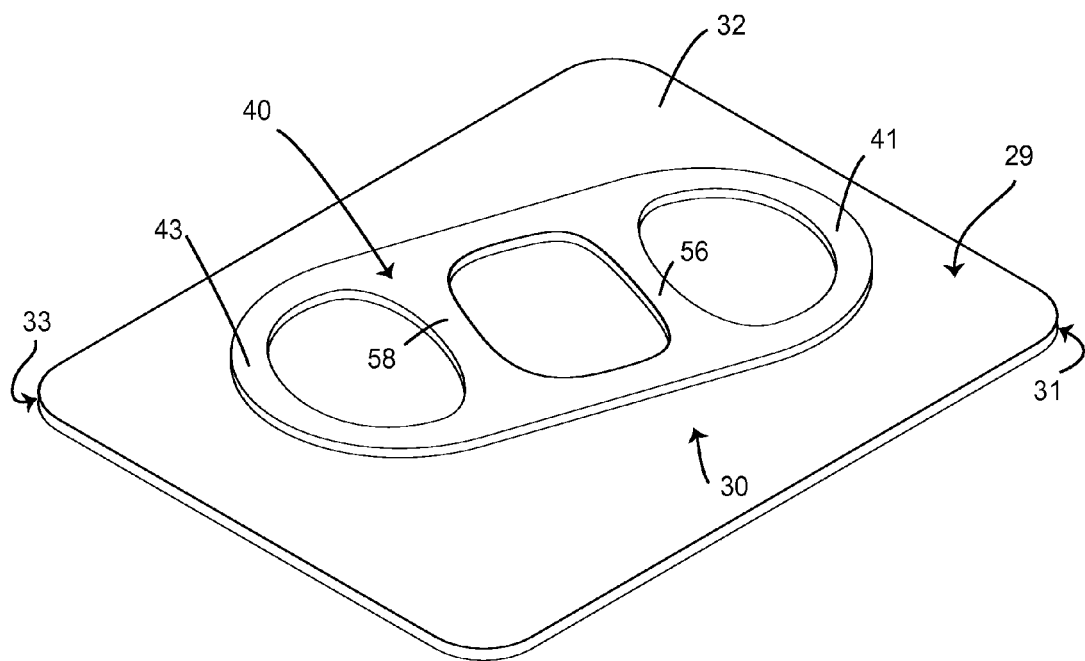
FIG. 3 is a perspective view of the device of FIG. 1, relative to the tablet, prior to being employed on the tablet.

The device 30 includes a central portion 35 having substantially parallel first and second side segments 37, 39 that connect to first and second end segments 41, 43. The central portion 35 includes first and second bands 56, 58 that define portions of the first and second openings 34, 36. The first and second bands 56, 58, lay flat when the device 30 is not engaged, as shown in FIGS. 1 and 3.

The first and second end segments 41, 43 have a curved planform profile on both exterior and interior side walls to engage with the corners 31, 33, respectively, of the tablet 32. The first and second end segments have first and second apexes 41a, 43a, respectively, at extreme ends of the device 30. The first and second openings 34, 36 are defined by the connection between the side segments 37, 39 and the first and second end segments 41, 43, respectively. The third opening 38 is positioned in the central portion 35 of the device 30.

When engaged with the first and second corners 31, 33, respectively of the tablet 32, the device 30 provides for one-handed support of the tablet 32 from the inactive back surface 29 or underside. More particularly, a user can slip his/her hand between the device and the back surface 29 of the device 30, and the tension of the device 30 when engaged with the tablet 32 will hold the tablet 32 against the user's hand. The user is thus free from having to rely on a flat hard surface, such as a table, countertop, or lap, to support the tablet 32. The support device 30 enables the user to employ the tablet 32 in a variety of positions, which greatly expands the universe of uses to which the tablet 32 can be applied. With the secure, one-handed support device 30 the user can now safely, confidently, and comfortably operate the tablet 32 while sitting, lying down, walking and even running-positions previously made impractical or impossible without the secure support device 30.

Figure 5:
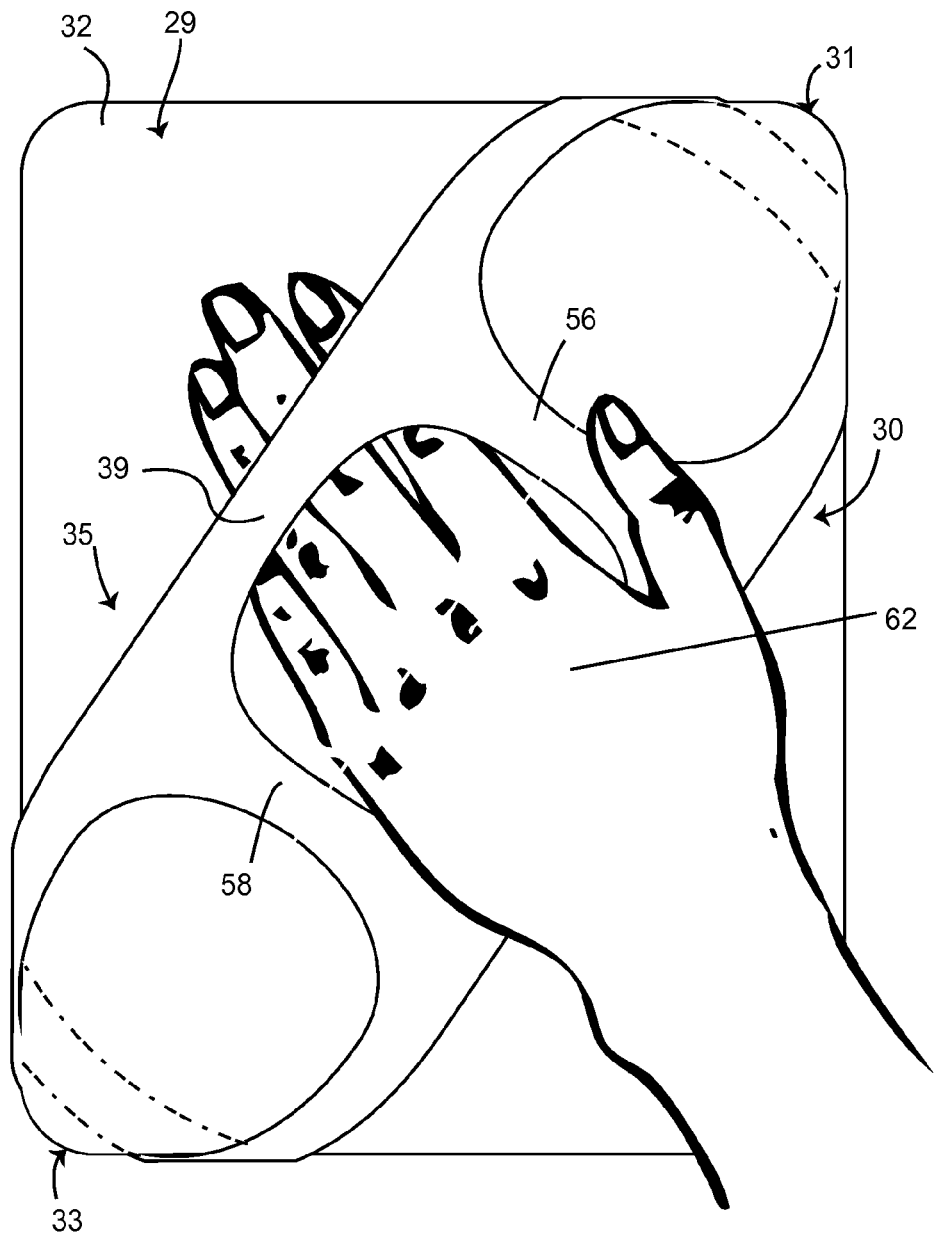
FIG. 5 is the applied device of FIG. 4 showing the device engaged with a user's hand.

The device 30 also enables a user to hold the tablet 32 in a variety of ways, at different angles, and with varying hand and finger positions without worrying that the hand holding the tablet 32 or the hand to which the tablet 32 is securely attached will interfere with the front active surface 52 (see FIG. 5). Without the back-based support device 30, the hand that supports the device 30 is prone to interfering with front active surface operations, such as selecting or inputting data into a computer application with a finger or stylus. The device 30 enables the user to securely hold the tablet 32 from the back surface 29 with one hand. This enables the user to perform keystrokes and otherwise manipulate functions on the front surface 52 with the free hand. This added functionality exists regardless of whether the user is standing, sitting, walking, or reclining. Typically, to avoid one of the user's hands interfering with the operation of the tablet while holding the tablet, the tablet 32 will be placed on a hard or fixed surface, such as a table. The device provides a secure support for the tablet without having to place the tablet on a hard or fixed surface for use.

Generally, care must be taken to prevent the front active surface 52 from being inadvertently scratched when putting the tablet 32 down. One embodiment of the present disclosure prevents the front active surface 52 from being scratched when the front active surface 52 is in contact with a hard surface, like a table or countertop. This is accomplished by the unique design of the device 30 that includes using a thickness, dimension line 44, of the device 30 that when applied around the corners 31, 33 will form raised front corner pieces 153, 155 with the first and second end segments 41, 43 (See FIG. 6A). The raised front corner pieces 153, 155 act as bumpers to create a space between the front active surface 52 and the hard surface upon which the tablet 32 is placed. The back surface 29 of the tablet 32 is protected as well by the back portion of the device, which also serves an anti-skid function. The tablet 32 is separated from the hard surface by the thickness of the device 30. When applied to the tablet 32, the first dimension 44 of the device 30 may become smaller as the material lengthens and conforms to the back surface 29 of the tablet 32.

When the tablet 32 is not in use, the protective support device 30 can be applied so as to be positioned across the tablet's front surface to cover a larger area of the front active surface 52 and protect the front surface from being scratched during transport. The ability to use the device 30 in this way highlights an important front guard feature of the device 30.

The elastomeric material's properties, elasticity, and dimensions permit the device 30 to be stretched so as to provide a secure fit when attached to the tablet 32. The device 30 can be made of a variety of materials provided they have the elastomeric attributes and characteristics such that the necessary security is provided, ensuring reliable support over the corner-anchor points while at the same time not being so tight across the back surface 29 as to restrict or fatigue the hand or fingers that engage it or to which the tablet 32 is securely held. The material is easily gripped to provide traction for the user's hand. The material is such that tactile engagement with the user's hand is gentle and comfortable. The material may have a tacky, gummy, or otherwise subtle adhesive quality to prevent the tablet 32 from slipping from the user's grip. In one embodiment of the present disclosure, the elastomeric material is silicone or rubber. Other types of suitable elastomeric material may be used in the manufacture of the device 30, such as pliable plastics and other synthetic polymers.

In one embodiment, the elastomeric material is a silicone polymer with silica having shore hardness in the range of 20 and 50, with 35 being preferable. This provides a comfortable tension over the user's hand when engaged with the tablet 32, while also being secure enough to prevent the device 30 from coming detached from the tablet 32. The mechanical properties include a tensile strength of 7.4 Megapascals and an elongation of 900%. The tear strength is 20 N/mm and the linear shrinkage is 4.3%.

In one embodiment, the central portion 35 of the device 30 may be more firm or rigid than the first and second end segments 41, 43. For example, the central portion 35 may be formed from an elastomeric material that is less flexible or stretchy than the first and second end segments. More particularly, the central portion 35 and the end segments 41, 43 may have different mechanical properties. In an alternative embodiment, the central portion 35 may be more flexible than the first and second end segments 41, 43 so that most of the elongation occurs in the central portion 35. In the embodiments with different stretching properties for the central portion 35 and the end segments 41, 43, the device 30 is still a unitary elastomeric material that can be formed in a single mold.

By using a unitary elastomeric material, the risk of injury to the user is eliminated and the risk of failure at connection points is reduced. There are no dangerous metal components that could snap-back and scratch the user or the tablet. In particular, there are no metal components that could come into contact with the more fragile front active surface of the device. Using a single elastomeric unitary device also prevents failures at the points of transition from one material to another.

The device 30 is of a particular nature that it can be easily applied to virtually any tablet 32 or object needing such a support system, regardless of the make, model, or dimensions of the object. Because of the way the material stretches, the device 30 can accommodate a wide range of sizes. And because of the manner in which the device 30 engages the corners of a tablet—that is by looping over opposing corners, the device 30 can be adjusted to the requirements of individual makes and models of tablets 32 so as not to obstruct key switches or ports. The device 30 can also be adjusted to form a variety of hand positions as will be described further herein.

The device 30 is self-contained, unitary, and non-intrusive in that nothing needs to be modified, configured, added, or altered on the tablet 32 itself in order to attach, use, remove, or re-attach the device 30. More particularly, the device 30 is configured to cover only a small portion of edges or sidewalls of the tablet 32, allowing the user to easily access various external ports, switches or inputs positioned on the edges of the tablet 32. The edge or sidewall of the tablet 32 is formed where the front and back surfaces of the tablet 32 meet. Even though each tablet 32 manufacturer has different specifications for where the external connection ports are located on the edges, the device 30 is configured to allow the user to access the various ports. For example, if the device 30 is configured to engage diagonal corners of the tablet, the device 30 is reversible so that the device 30 can be attached to either set of opposing corners to avoid obstructing one of the ports on the edge of the tablet 32. In addition, the first and second ends 41, 43 of the device 30 are configured to be adjustable to accommodate different locations of input receptacles, ports, and switches on different objects 32. This is possible because of the elastomeric qualities of the device 30. The ends 41, 43 can easily be slid further on or further off the corners 31, 33 to provide access to these inputs. Alternatively, the ends 41, 43 may be used to cover a switch, such as a power switch, to prevent the switch from being inadvertently engaged.

Figure 2A:
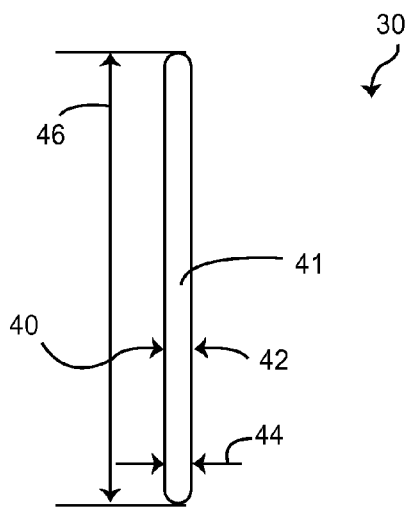
FIGS. 2A-2C are side and top views of the device in FIG. 1.

FIG. 2A is a side view of the first end segment 41 that has a first dimension shown by the dimension line 44, which can vary depending on the type of material used to form the device 30 and on the manufacturing techniques. The first end segment 41 has a second dimension that is a distance between external edges of the first and second side segments 37, 39, which is shown by dimension line 46. In one embodiment, the first dimension 44 is in the range of 0.2 cm to 0.6 cm and the second dimension 46 is in the range of 9 cm to 13 cm. The device 30 is constructed to be symmetrical along both a longitudinal axis X-X and a transverse axis Y-Y. Accordingly, a side view from the second end segment 43 of the device 30 is identical to the side view of the first end segment 41 in FIG. 2A.

Figure 2B:
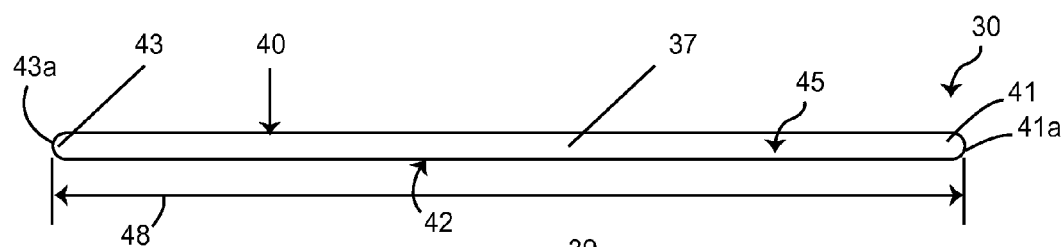

FIG. 2B is a side view of the first edge or side segment 37. The device 30 has a third dimension shown by dimension line 48, which is the distance between the apexes 41a, 43a of the first and second end segments 41, 43. The third dimension 48 is less than a corner-to-corner distance of the tablet 32, see FIG. 1. In one embodiment, the third dimension 48 is in the range of 20 cm to 24 cm. As mentioned above, the device 30 is symmetrical, and a side view of the second side segment 39 is identical to the first side segment 37 shown in FIG. 2B. The range of dimensions allows for artistic variations in the cosmetic appearance of the device to enhance its visual appeal.

Figure 2C:
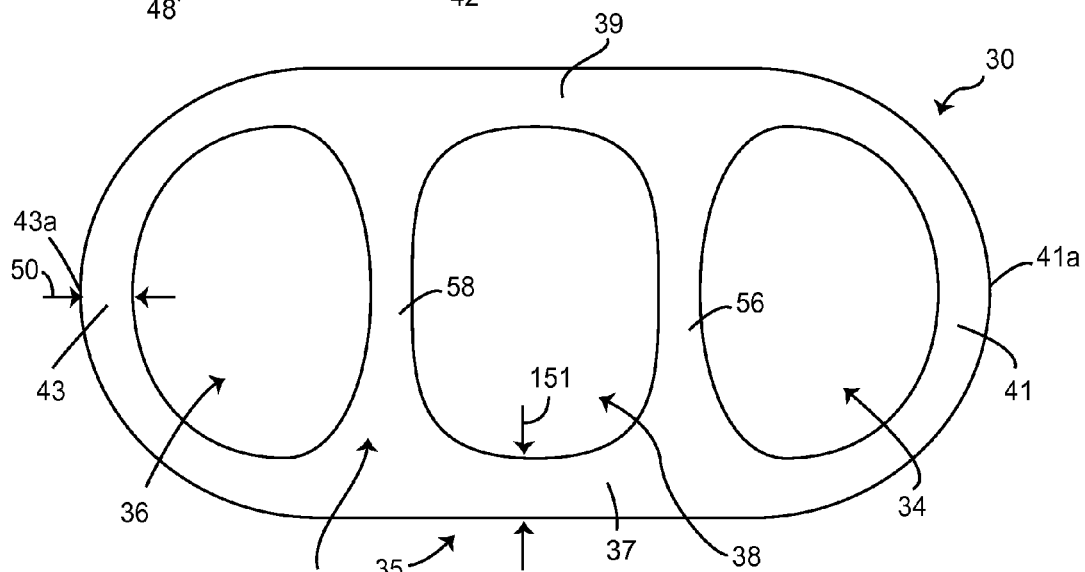

FIG. 2C is a top planform view of the device 30 having the first, second, and third openings 34, 36, 38. The first and second end segments 41, 43 have a fourth dimension 50, which can vary depending on the ornamental design of the device 30. In one embodiment, the fourth dimension 50 is in the range of 0.9 cm to 1.3 cm. A fifth dimension, 151 is in the range of 0.9 cm and 1.7 cm.

The device 30 also includes the first and second bands 56, 58 that connect the first and second side segments 37, 39 together. The first and second bands 56, 58 are tapered from a first connection point 51 coupled to the first side segment 37 and to a second connection point 53 coupled to the second side segment 39. A widest portion of the connection points 51, 53 shown by dimension line 55, is in the range of 4 and 5 cm. A thinnest portion of the first and second bands 56, 58 are shown by dimension line 57 and are in the range of 0.75 cm to 1.25 cm. The first and second bands 56, 58 help to retain a selected shape when the device 30 is applied to the tablet.

The size and shape of the openings 34, 36, 38, the dimensions of the device 30, and the angles of curvature of the first and second end segments can each be varied independently to change the appearance of the device 30. The shapes of the holes and the corresponding end segments are ornamental features and cosmetic in nature. For example the radius of curvature can be varied, and it can be varied among the openings or varied within the same opening. As can be seen in the various embodiments described herein, the function of the device 30 is not determinative of the shape of these features.

In a preferred embodiment, the device 30 is 3.5 mm for the first dimension 44, 110 mm for the second dimension 46, 220 mm for the third dimension 48, 12.5 mm in the fourth dimension 50, and 15 mm in the fifth dimension 151. The first and second bands may also be 12.5 mm, see dimension line 57. The apexes 41a, 43a of the device are curved or otherwise rounded, such that the curvature has a radius of 1.5 mm. In some embodiments all edges of the device will be curved or rounded outward from the device 30 as the apexes 41a, 43a are shown in FIG. 2B. The curvature will make it easier to apply, adjust, and remove the device 30 from the tablet 32.

FIG. 3 is a perspective view of the device 30 resting on the back surface 29 of the tablet 32 in a disengaged configuration. In order to engage the device 30 with the tablet 32, the user places or pulls the first end segment 41 over the first corner 31 such that a portion of the second surface 42 of the device 30 is releasably engaged with the front surface 52 of the tablet 32. The user then engages the second end segment 43 with the second corner 33 of the tablet 32 in the same manner as above, although the device 30 will need to be stretched to engage the second end segment 43 with the opposing corner of the tablet 32. The first and second end segments 41, 43 may be engaged in any order or simultaneously.

Figure 4:
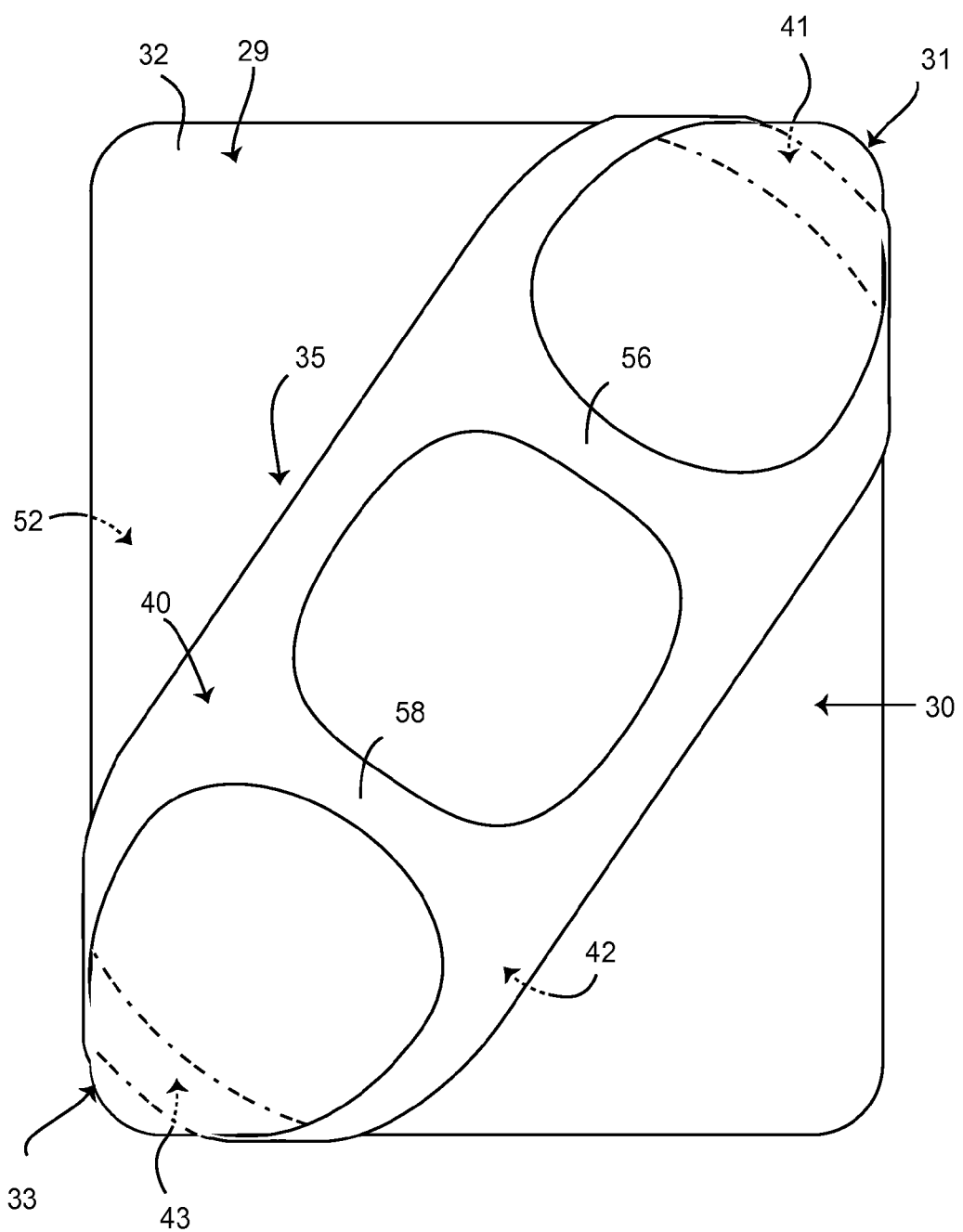
FIG. 4 is a back view of the tablet having the device of FIG. 1 applied over the back surface.

FIG. 4 shows the device 30 applied to the back surface 29 of the tablet 32. When slipped and secured over the first and second opposing corners 31, 33 of the tablet 32, the end segments 41, 43 form a snug grip on the tablet's corners 31, 33. The first and second end segments 41, 43 are in contact with and secured to the front surface 52 of the tablet 32. When the device 30 is engaged with the tablet 32, the first surface 40 of the device 30 is the only surface of the device visible because the second surface 42 is facing the tablet. More particularly, the second surface 42 is adjacent to and in contact with the front and back surfaces 52, 29 of the tablet 32.

When the device 30 is applied to the tablet, the first and second opposing corners 31, 33 of the tablet extend through the first and second openings 34, 36. As the device 30 is stretched to be applied on the tablet, the shapes of the first and second openings 34, 36 deform as the material in the first and second end segments 41, 43 stretches to accommodate the respective corners 31, 33. The central opening 38 and the central portion 35 also deform as the device 30 is stretched. Once applied over the corner, each of the first and second end segments 41, 43 can be adjusted to allow more or less of the first or second corner 31, 33 to extend through the first or second opening 34, 36. If the first or second end segments 41, 43 are adjusted towards a center of the tablet away from the corners 31, 33, the first and second openings will deform further as the material of the device 30 stretches and expands. For example, the first and second openings 34, 36 may become wider as the amount of the corner extending through the opening increases.

In one embodiment, the first and second bands 56, 58 of the central portion 35, "stand up" to form two finger holds or "handles" when the device 30 is applied to the tablet 32. These miniature handles, formed from bands 56, 58, can be utilized by a user's thumb or finger to hold the tablet securely yet comfortably. The handles can be formed by sliding the first and second side segments 37, 39 towards each other and towards a center of the back surface 29 when engaged with the tablet 32. In an alternative embodiment, the device 30 may have a plurality of bands forming an ornamental pattern, which when applied to the tablet 32 provide the user with a variety of finger holds or hand holds for grasping the tablet securely with one hand.

Because the device 30 is made of resilient expandable material, the tension of the device 30, when applied to the tablet 32, changes depending on the amount of the corners 31, 33 extending through the first and second openings 34, 36. If the first and second side segments 37, 39 are positioned as far away from each other as possible, the device 30 will lay flat against the back surface 29 of the tablet 32. Due to the resilient properties of the device, the user can comfortably slide or otherwise position his/her hand between the device and the back surface 29 of the tablet 32, see FIG. 5. Alternative hand positions can be achieved by adjusting the first and second side segments 37, 39 towards each other. As the first and second side segments 37, 39 move towards each other, the tension in the first and second bands 56, 58 is reduced, which causes the first and second bands 56, 58 to raise up from the back surface 29.

FIG. 5 shows the user's hand 62 engaged with the device 30 to support the tablet 32 with only a single hand 62. In this illustration the user's hand is positioned over the first side segment 37 and under the second side segment 39. Alternatively, the user may slide their hand 62 beneath both the first and second side segments. The user may also engage his/her hand 62 with the device 30 and the tablet 32 by sliding one or more fingers under the first or second bands 56, 58. When engaged, the palm of the user's hand 62 may touch the back surface 29 of the tablet 32 as the second surface 42 of the device 30 bears against the dorsal surface or back of the user's hand 62. The area of the device 30 that bears against the back of the tablet 32 represents a portion of the device 30 by which the user supports the tablet by employing various hand and finger positions.

Figure 6A:
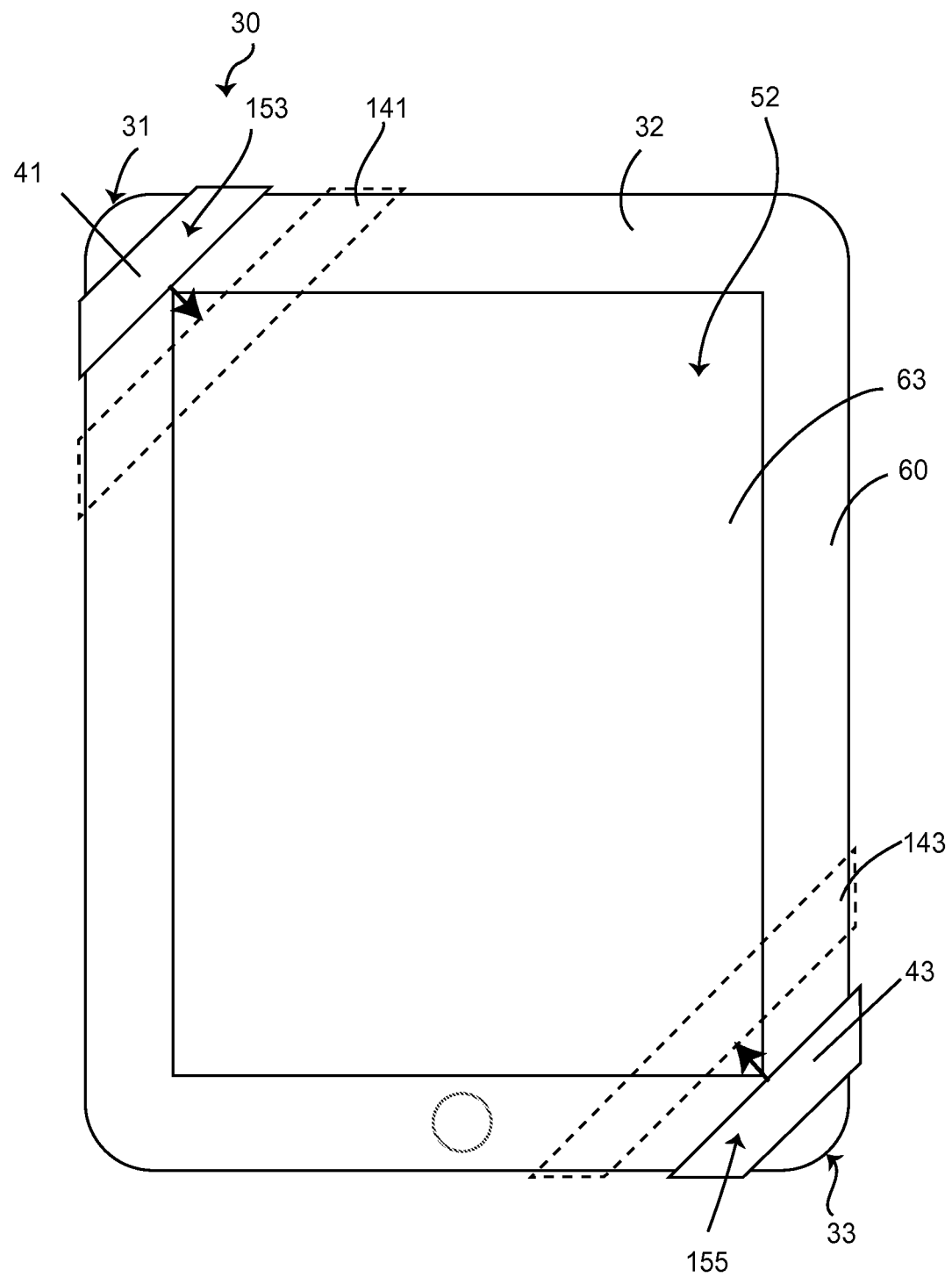
FIGS. 6A and 6B are front views of the tablet of FIG. 4 having end segments of the device engaged with a front surface and the back surface at a corner of the tablet, respectively.

In FIG. 6A, the first and second end segments 41, 43 cover portions of the front surface 52 of the tablet 32. The front surface 52 includes the border 60 and the active touch-screen 63. The first and second end segments 41, 43 grip the border 60 while not interfering with the touch-screen 63. As described above, in addition to anchoring the device 30 on the tablet 32, the first and second end segments 41, 43 also act as two front "bumpers" 153, 155 which serve to protect the front surface 52 of the tablet 32 when placed with the front active surface facing a hard surface. The first and second end segments 41, 43 also serve as an alternative method for holding the tablet 32 by the user holding one corner between a user's thumb on the front side and one or more of the user's other fingers on the back side.

In some instances, positioning the device 30 to have the second surface 42 in contact with the back surface 29 of the tablet 32 will result in more of the first and second corners 31, 33 extending through the first and second openings 34, 36. As shown in FIG. 6A, the first and second end segments 41, 43 can be adjusted towards each other on the front surface 52 of the tablet, see the arrows showing adjustment towards each other and the center point of the tablet. Dashed first and second end segments 141, 143 show an alternative position of the first and second end segments 41, 43. This alternative position of the dashed first and second end segments 141, 143 results in the first and second apexes 41a, 43a covering a portion of the touch-screen 63 and the border 60. This also results in more material of the first and second end segments being in contact with the front surface 52 of the tablet 32.

As the first and second end segments 41, 43 are moved towards each other to the alternative position of the dashed first and second end segments 141, 143, the first and second openings 34, 36 continue to deform to accommodate more of the corners 31, 33. This alternative position of the dashed first and second end segments 141, 143 covers more of the front surface 52 of the tablet and thus offers more protection for the front surface 52. As the first and second end segments 41, 43 are moved toward the center of the tablet 32, the tension of the device 30 increases across the back surface 29.

In an alternative embodiment, the device 30 may be applied so that the first and second corners 31, 33 extend through the openings in different amounts. Such an asymmetrical orientation will cause the central opening 38 to be shifted from the center of the tablet 32. This can create a handle offset from the center of the tablet 32 for an alternative hand position.

Figure 6B:
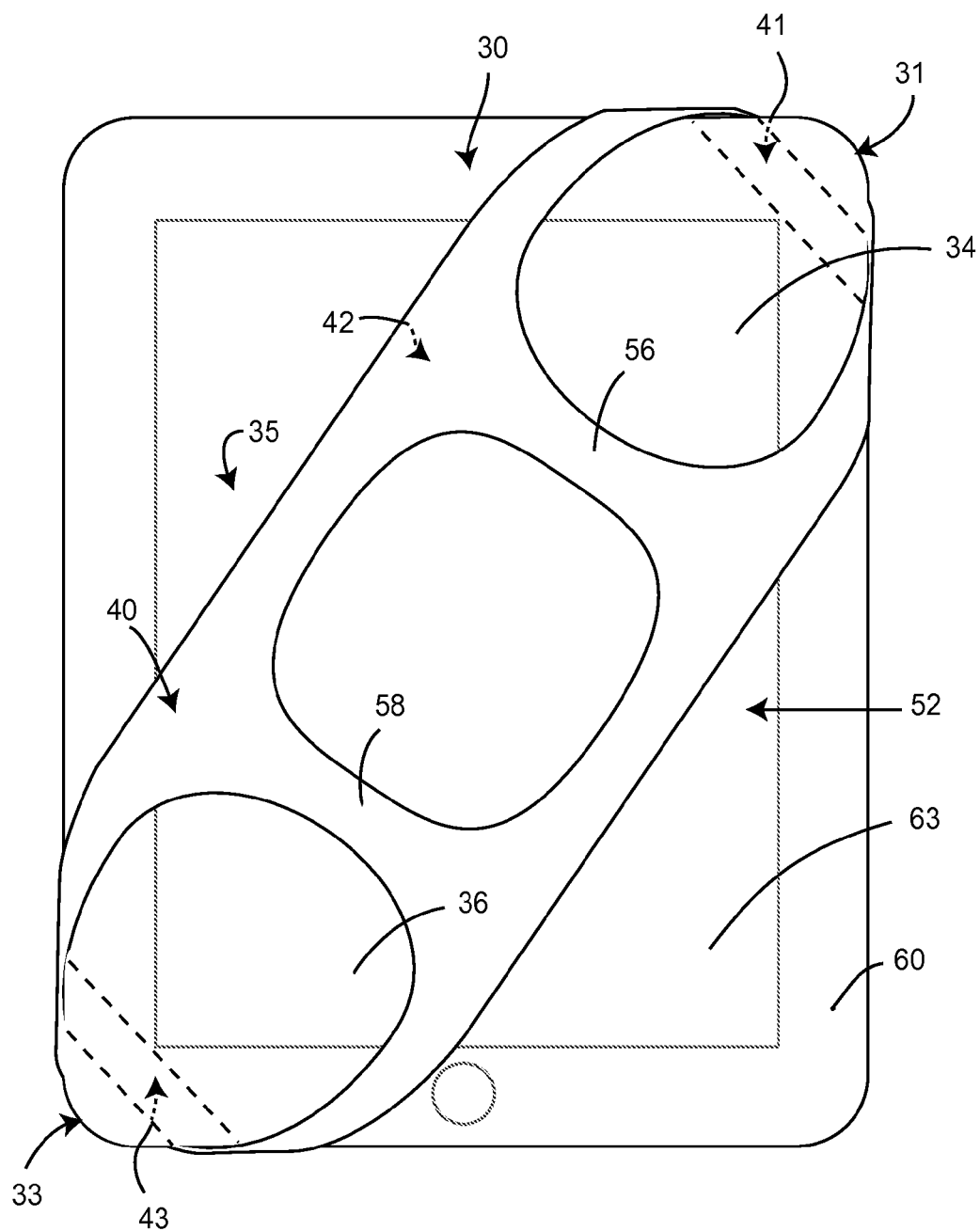

FIG. 6B illustrates the device 30 positioned in an alternative arrangement on the front surface 52 of the tablet 32 to protect the touch-screen 63 during transport or when otherwise not in use. In this arrangement, the majority of the second surface 42 of the device 30 is in contact with the front active surface 52 of the tablet 32. This provides the front active surface 52 with protection from being scratched or other damaging impact when not in use.

Figure 7:
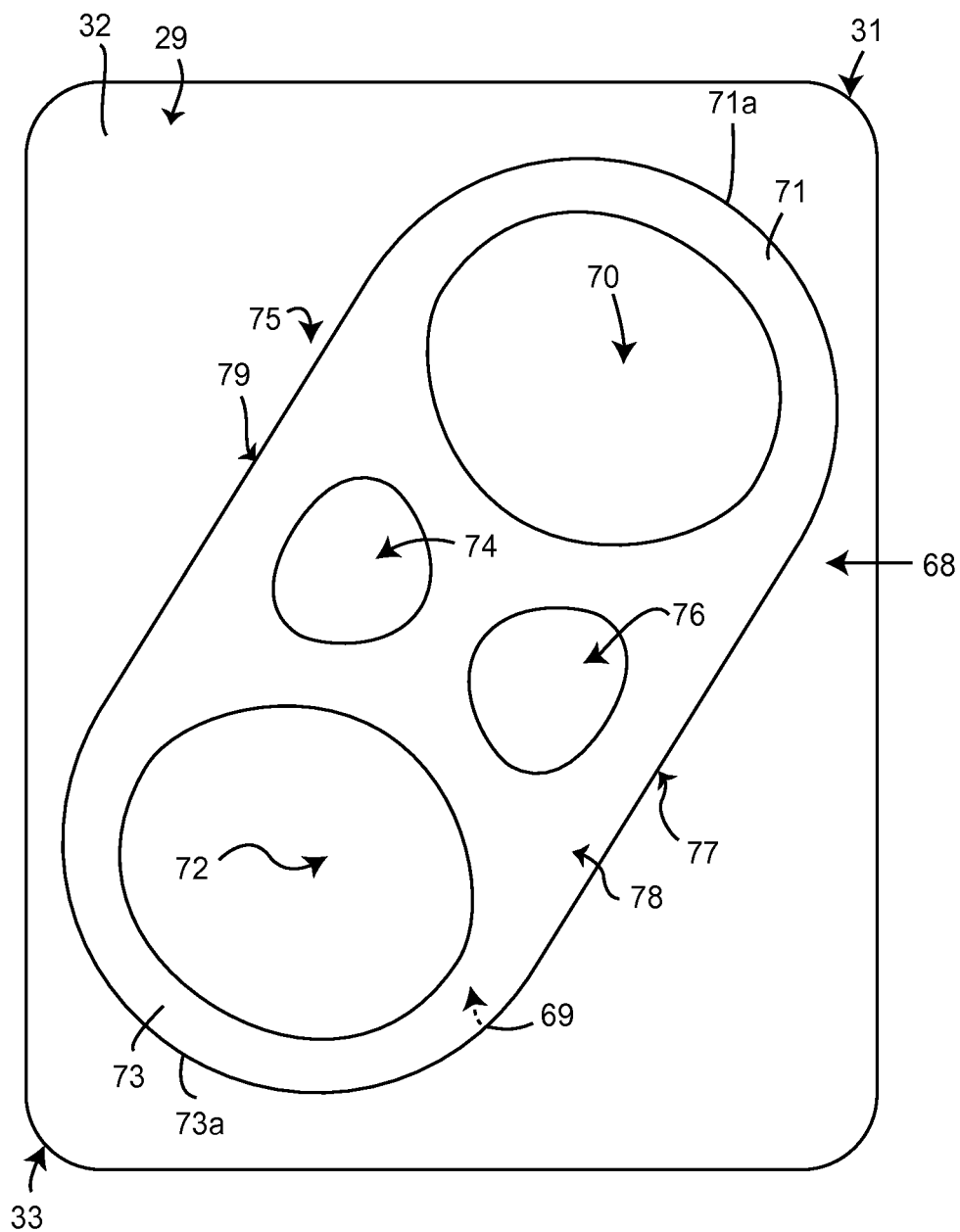
FIG. 7 is a top view of an alternative embodiment of a protective support device resting on a back surface of a tablet in a disengaged configuration in accordance with the present disclosure.

FIG. 7 shows an alternative embodiment of a protective support device 68 having first and second round openings 70, 72 that are delimited by first and second end segments 71, 73, respectively. The end segments 71, 73 have apexes or extreme ends 71a, 73a at the outer curvature of the first and second end segments 71, 73. The device 68 includes a central portion 75 having first and second side segments 77, 79. The first and second side segments 77, 79 are substantially parallel to each other and connect to the first and second end segments 71, 73 to make a continuous perimeter of the device 68. In addition, the central portion 75 has two smaller holes 74, 76 near the first and second side segments 77, 79 of the device 68. The larger first and second openings 70, 72, are designed so as to loop over opposing corners 31, 33 of the tablet 32. The smaller holes 74, 76 are designed as finger holes by which one can hold the tablet 32 (see FIG. 11).

The smaller holes 74, 75 are triangular in shape with rounded corners or vertices. The shape of these smaller holes is purely cosmetic. For example, the smaller holes 74, 75 may be circular, oval, teardrop, or any other suitable shape. More particularly, the radii of curvature of these holes 74, 75 can be varied to create other aesthetically pleasing shapes.

Figure 8A:
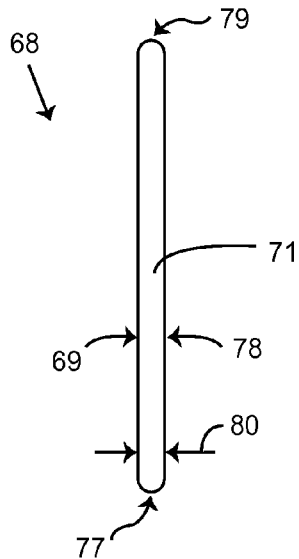
FIGS. 8A-8C are top and side views of the device of FIG. 7.
Figure 8B:
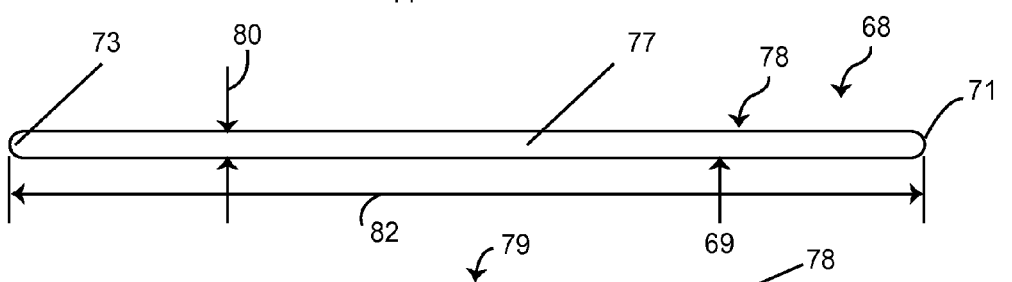
Figure 8C:
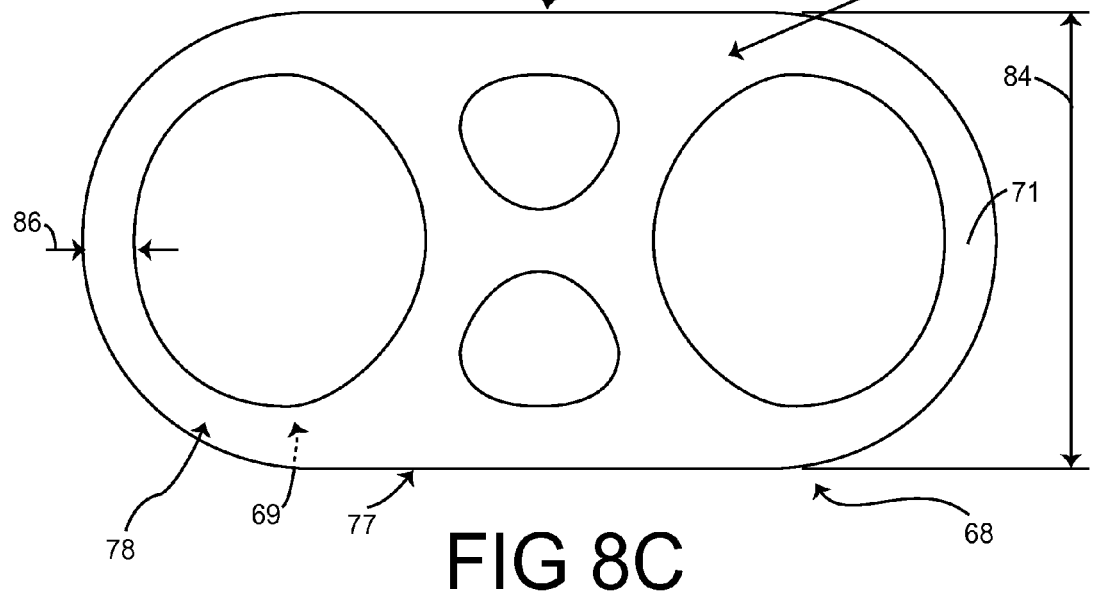

FIG. 8A is a side view of the first end segment 71 of the device 68. The device 68 is symmetrical and the side view of the second end segment 73 is identical in this embodiment. FIG. 8B is a side view of the first edge 77 of the device 68. FIG. 8C is a top down view of a first surface 78 of the device 68. The device 68 also has a second surface 69 that is configured to face the back surface 29 of the tablet 32. The device 68 has a first dimension 80 that is a thickness of the device 68 before attaching the device 68 to a tablet 32. When applied to the tablet 32, the first dimension 80 of the device 68 may become smaller as the material lengthens and conforms to the back surface 29 of the tablet 32.

The device 68 has a second dimension 82 prior to application to the tablet 32. The second dimension 82 is less than a distance taken diagonally from the first corner 31 to the second corner 33 of the tablet 32. The device 68 has a third dimension 84 between the first and second edge 77, 79. The third dimension 84 is smaller than the second dimension 82.

The first and second side segments 71, 73 of the device 68 have external edges that are rounded or curved and inner edges of the first and second circular openings 70, 72 that are equally rounded or curved. Accordingly, the first and second side segments 71, 73 are a consistent thickness 86 until they connect to the central portion 75. In an alternative embodiment, the thickness 86 can vary to make a variety of patterns or shapes.

Figure 9:
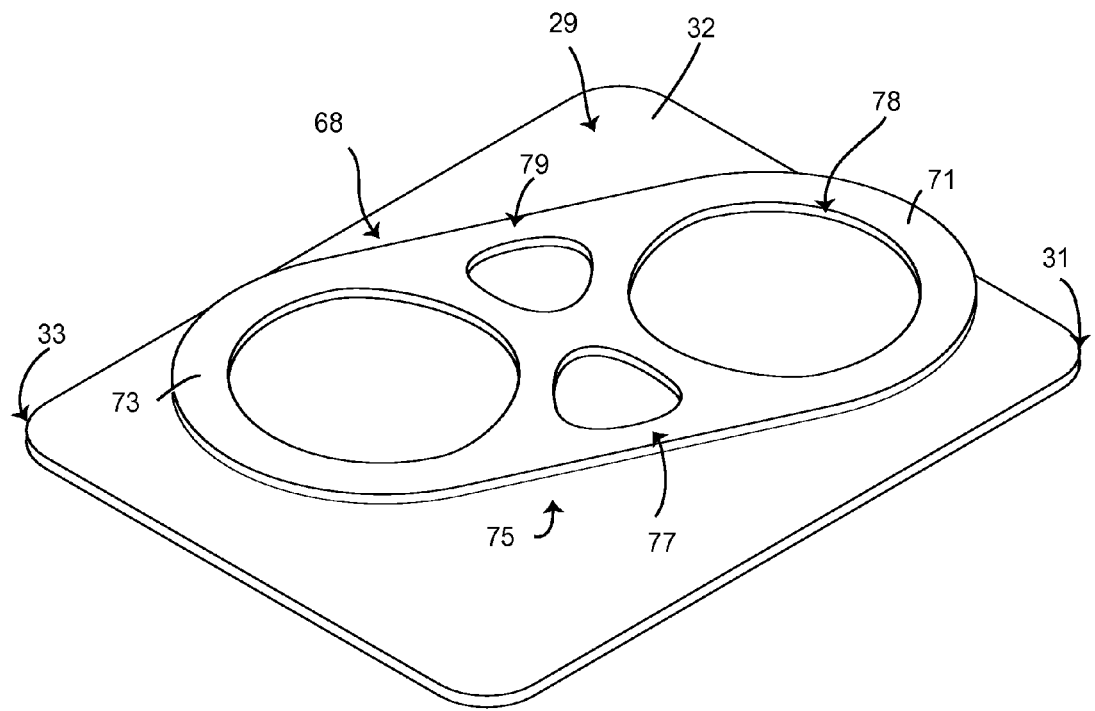
FIG. 9 is a perspective view of the device of FIG. 7, relative to the tablet, prior to being engaged with the tablet.
Figure 10:
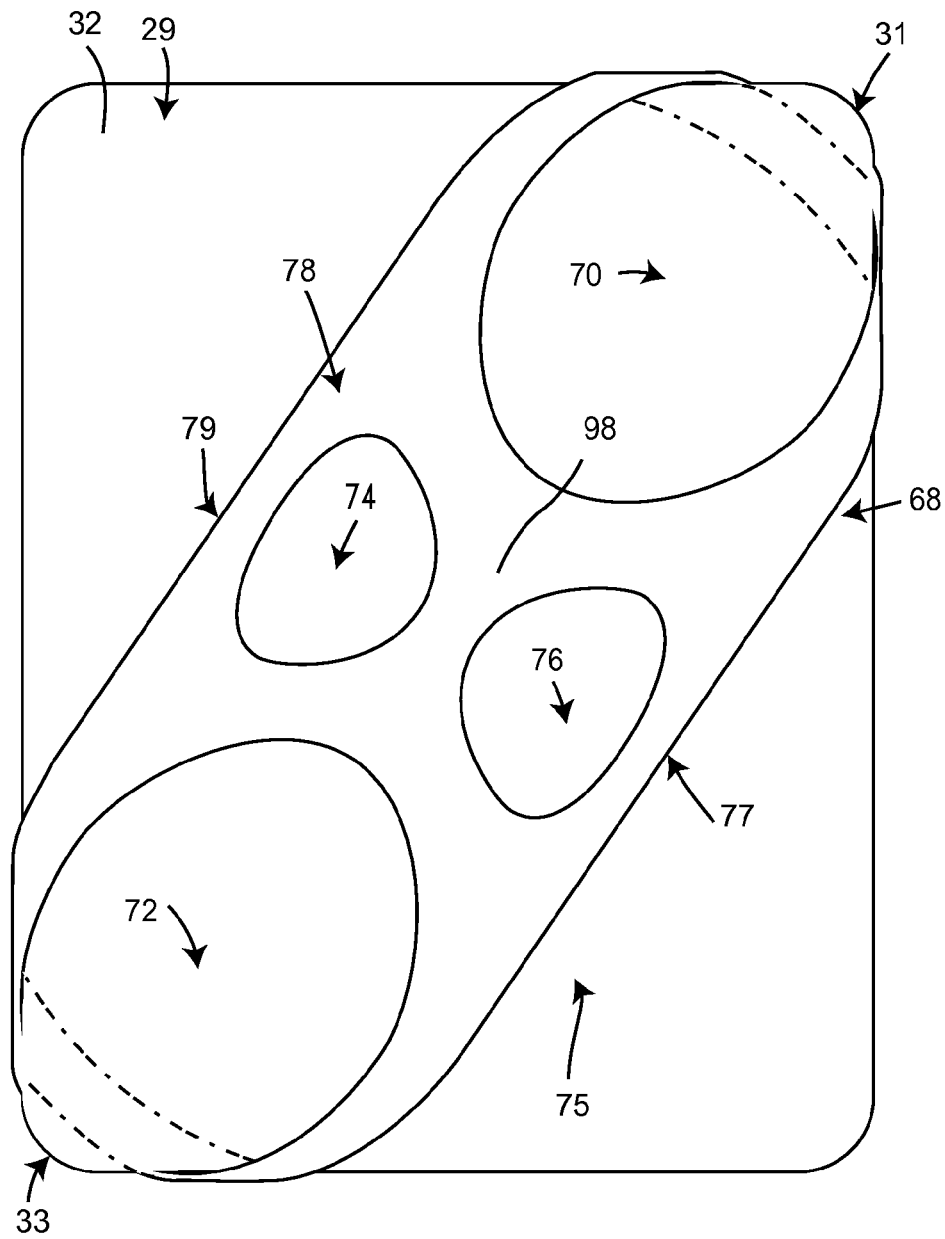
FIG. 10 is a back view of the tablet having the device of FIG. 7 applied over the back surface.

FIG. 9 is a perspective view of the device 68 resting on the back surface 29 of the tablet 32 in a disengaged configuration. FIG. 10 is the device 68 applied to the tablet 32 in an engaged configuration. When stretched, the device 68 conforms to the back surface 29 of the tablet 32 and creates a tension sufficient to securely hold the device 68 to the user's hand on the back surface 29. When elongated and secured over the first and second opposing corners 31, 33 of the tablet 32, the first and second end segments 71, 73 are engaged with the front surface 52 of the tablet 32. The second surface 69 of the device 68 is facing the back surface of the tablet 32, with small portions of the second surface 69 contacting the front active surface 52 at the corners 31, 33.

Figure 11:
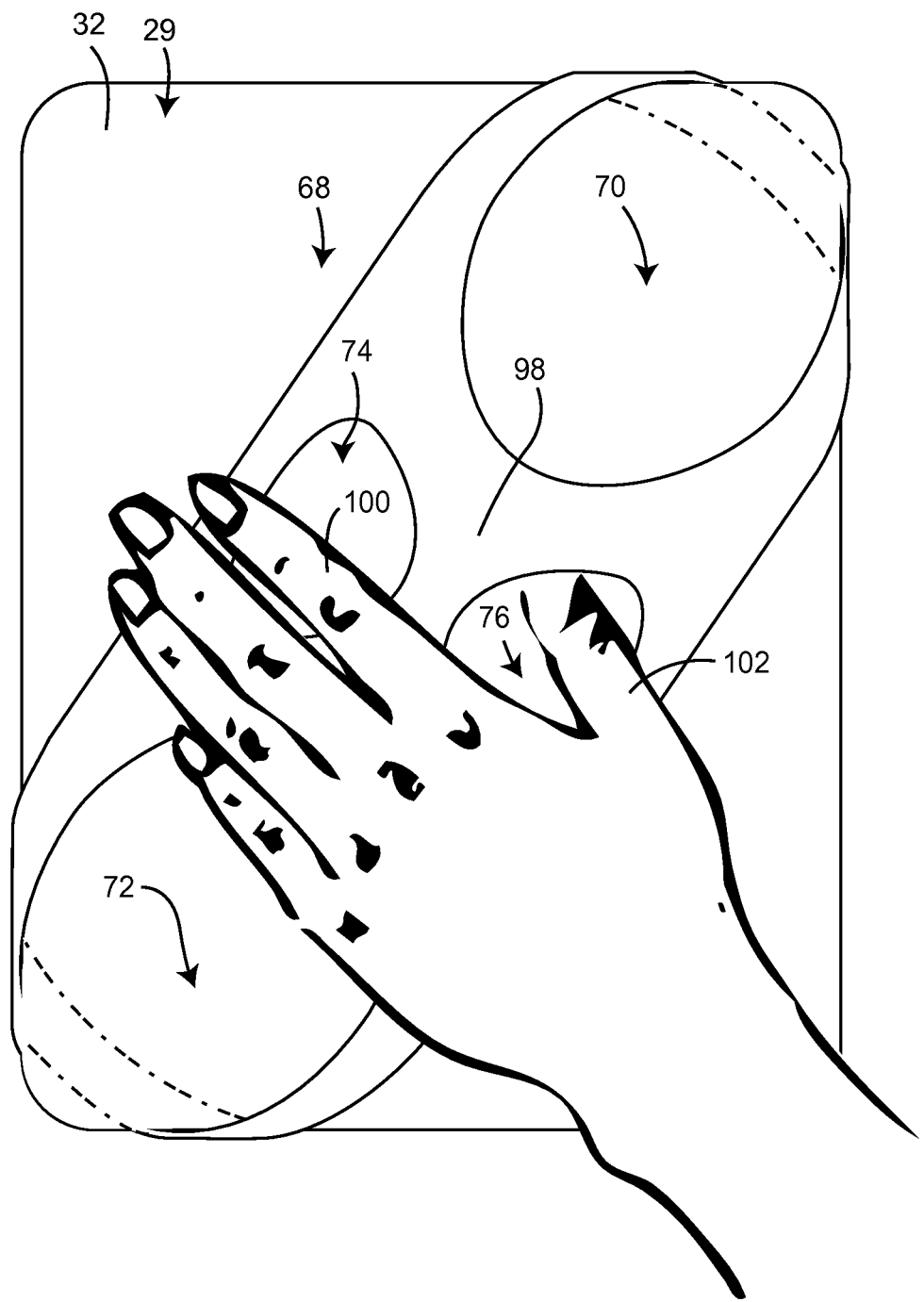
FIG. 11 is the applied device of FIG. 10 showing the device engaged with a user's hand.

The first and second circular openings 70, 72 deform as the device 68 is stretched across the back surface 29 of the tablet 32. In one embodiment, the openings 70, 72 enlarge in diameter when the device 68 is stretched. The device 68 forms a snug grip on the corners 31, 33 of the tablet 32. The central portion 75 of the device 68 containing the two smaller holes 74, 76 lies flat when the device 68 is not engaged on the tablet 32 as in FIG. 9. This same area, central portion 75, can be manipulated to "stand up" to form a "handle" 98 when the device is applied to the tablet 32. This miniature handle 98 can be utilized by a user's thumb or fingers in a number of ways, such as that illustrated in FIG. 11. The user's thumb 102 is threaded through the smaller hole 76 with the user's other fingers not engaged through the device 68. In an alternative hand position, the user's index finger 100 may be threaded through the other smaller hole 74. In other embodiments, the user may engage the device 68 through one or more of the openings 70, 72, 74 and 76. The portion of the device 68 that rests on the back surface 29 of the tablet 32 represents the primary area by which a user supports the tablet 32 by employing various hand and finger positions 102 as shown in FIG. 11.

Figure 12:
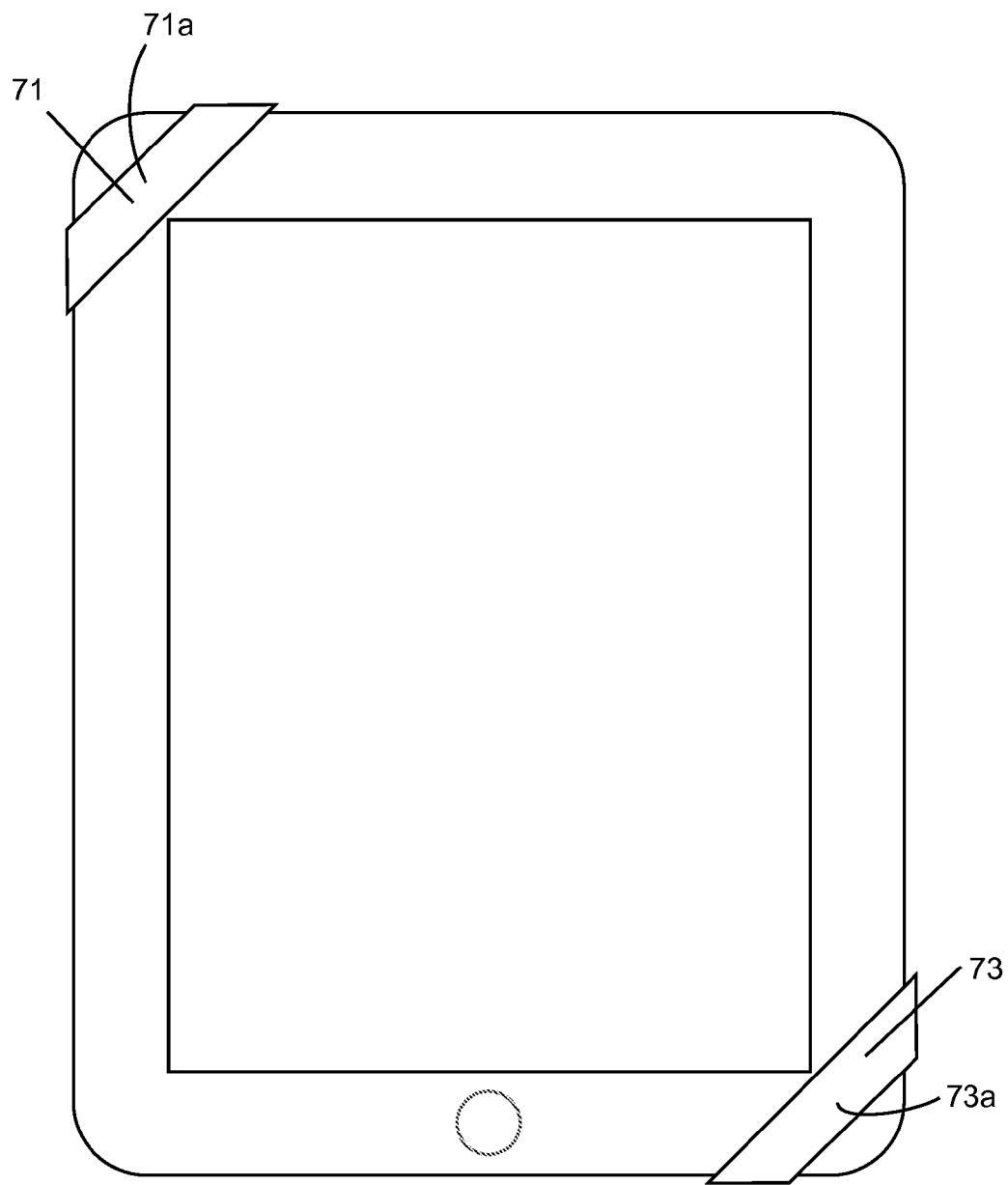
FIG. 12 is a front view of the tablet of FIG. 7 having end segments of the device engaged with a front surface of the tablet.

In FIG. 12, the apexes 71a, 73a of the first and second end segments 71, 73 of the device, in addition to anchoring the device on the tablet 32, also act as two front "bumpers" which serve to protect the front surface 52 of the tablet 32 when placed face down. The first and second end segments 71, 73 also serve as an alternative method for holding the tablet 32 by gripping one of the end segments on the front active surface with one's thumb.

Figure 13:
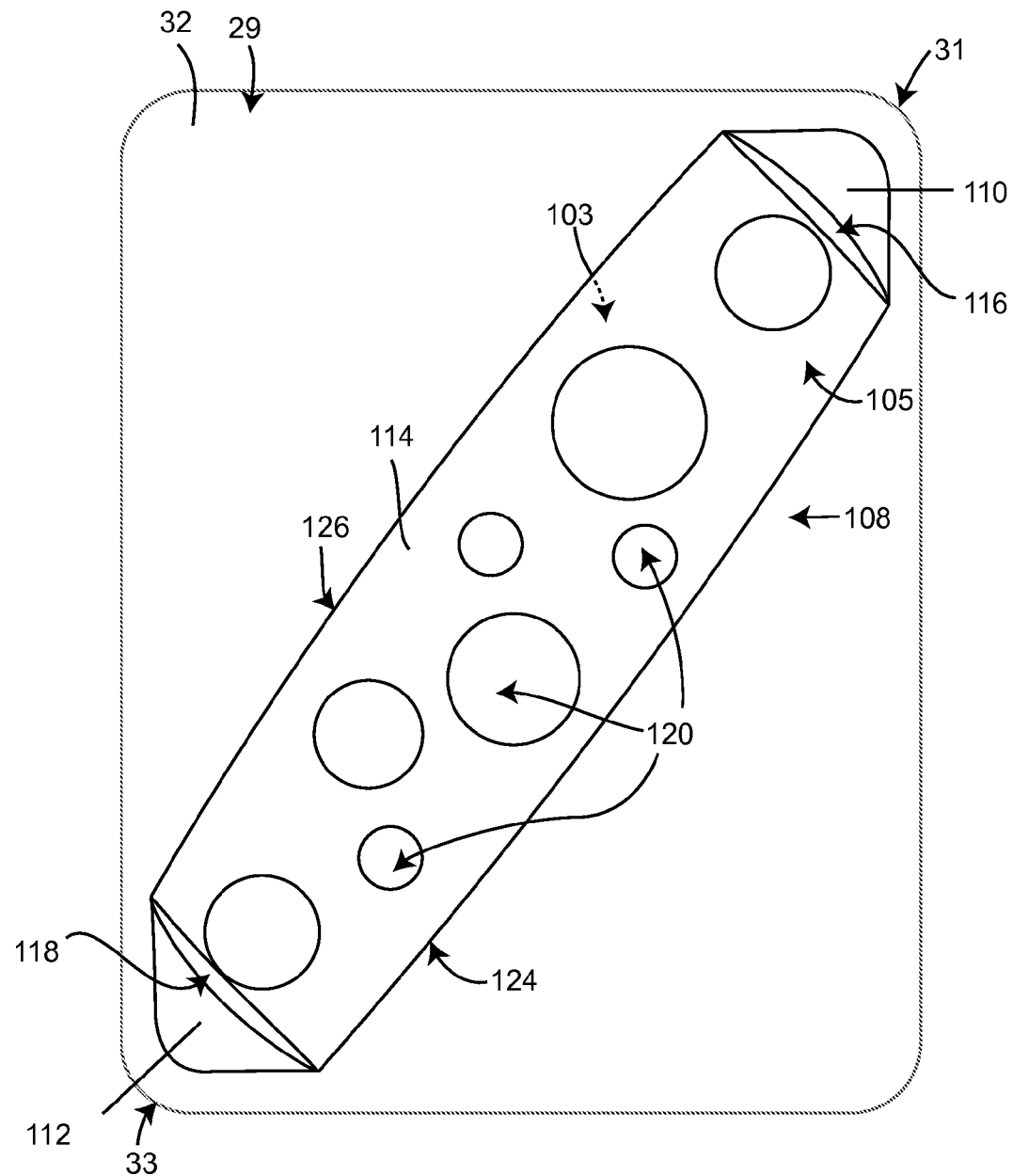
FIG. 13 is a top view of another embodiment of a protective support device resting on a back surface of a tablet in a disengaged configuration in accordance with the present disclosure.

Another embodiment of the present disclosure is provided in FIG. 13 that includes a protective support device 108 having a body 122 with first and second corner-receiving pockets 110, 112 configured to engage with the first and second corners 31, 33 of the tablet 32. The device 108 is a singular piece of elastomeric material with the first and second corner-receiving pockets 110, 112 at each end. A length of the device 108 is shorter than the corner-to-corner dimension of the tablet 32 to which it is to be applied.

Figure 15:
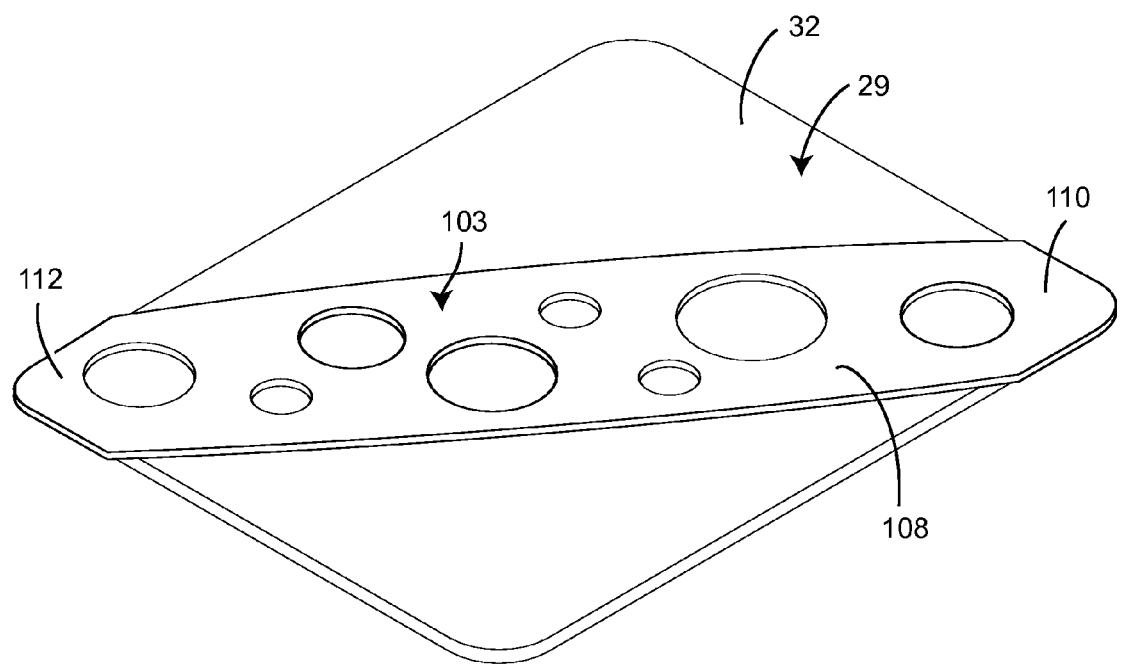
FIG. 15 is a perspective view of the device of FIG. 13, relative to a tablet, prior to being engaged with the tablet.
Figure 16:
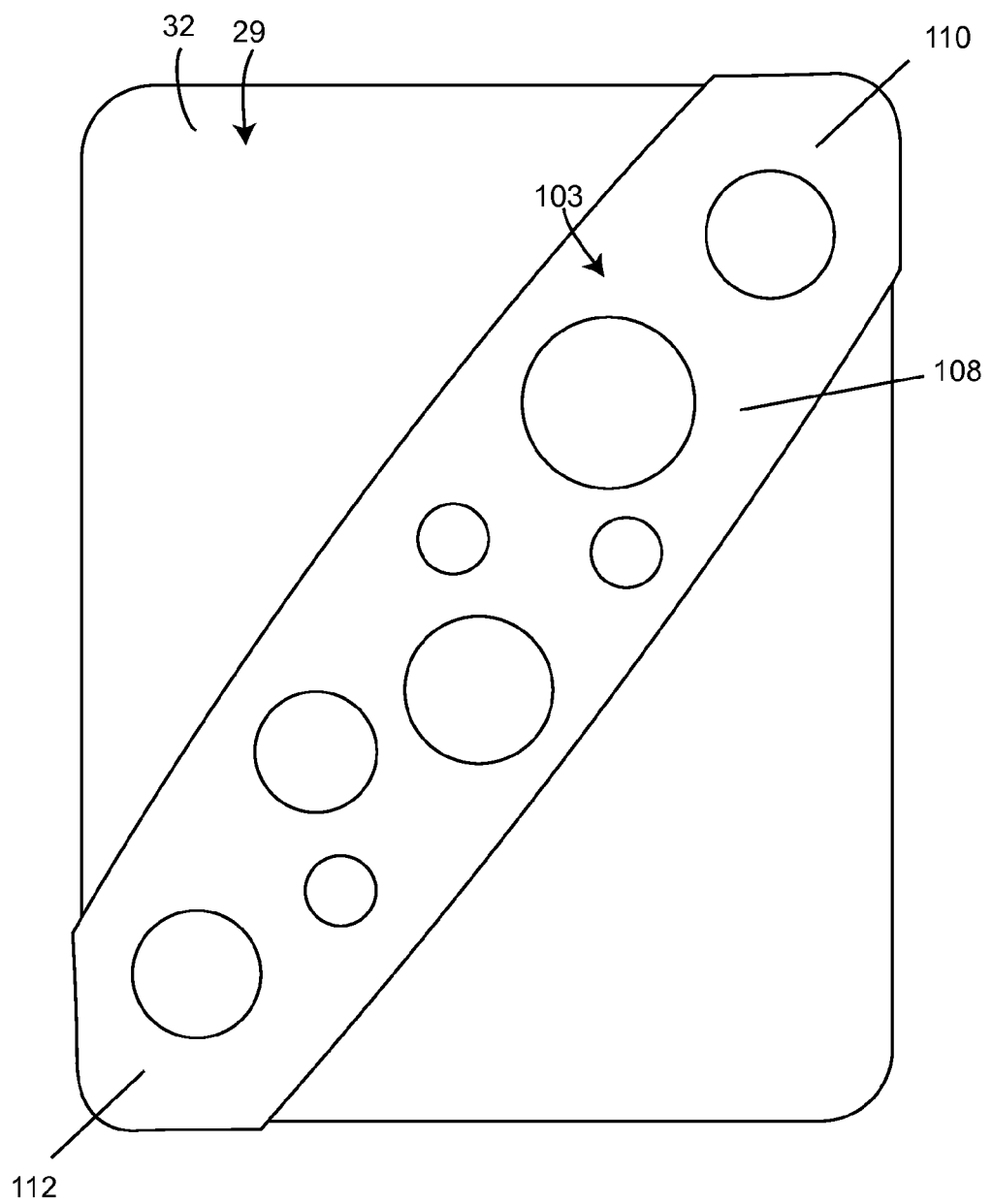
FIG. 16 is a back view of the tablet having the device of FIG. 13 applied over the back surface.

In FIG. 13, a first surface 103 is facing the back surface 29 of the tablet 32. A second surface 105 is facing away from the tablet 32. First and second slotted openings 116, 118 form openings for the first and second pockets 110, 112, respectively. It is by these two openings 116, 118 that the corner pockets engage the opposing corners of the tablet 32 as shown in FIG. 15. There are a series of holes 120 of various sizes cut out of a central portion 114 of the device 108 that will be stretched across the back surface 29 of the tablet 32. The holes 120 are ornamental and can be any shape or size. This central portion 114 of the device 108, and accompanying holes 120, are the primary area to be engaged with the hand and fingers when the device is secured to the tablet 32.

FIG. 14A is a side view of the first pocket 110 of the device 108. A portion of the second pocket 112 and the second opening 118 are visible. FIG. 14B is a side view of a first edge 124, and the opposing second edge 126 is seen in FIG. 13. FIG. 14C is a top down view of the second surface 105 of the device 108. FIGS. 14A and 14B show how the pockets 110, 112 extend away from the second surface 105 of the device 108 to form cavities or pockets for the corners of the tablet 32. The pockets 110, 112 can be manufactured to accommodate various sizes and shapes of tablets onto which the device 108 may be applied.

FIGS. 15-18 are various views of the device 108 applied to the tablet 32. When the first and second corner pockets 110, 112 are secured over the first and second opposing corners 31, 33 of the tablet 32 these pockets capture the corners of the tablet 32 and cover portions of the front surface 52 and back surface 29 (see FIG. 18). The second surface 105 of the device 108 is adjacent to and can contact the back surface 29 of the tablet 32 while the first surface 103 remains exposed.

Figure 17:
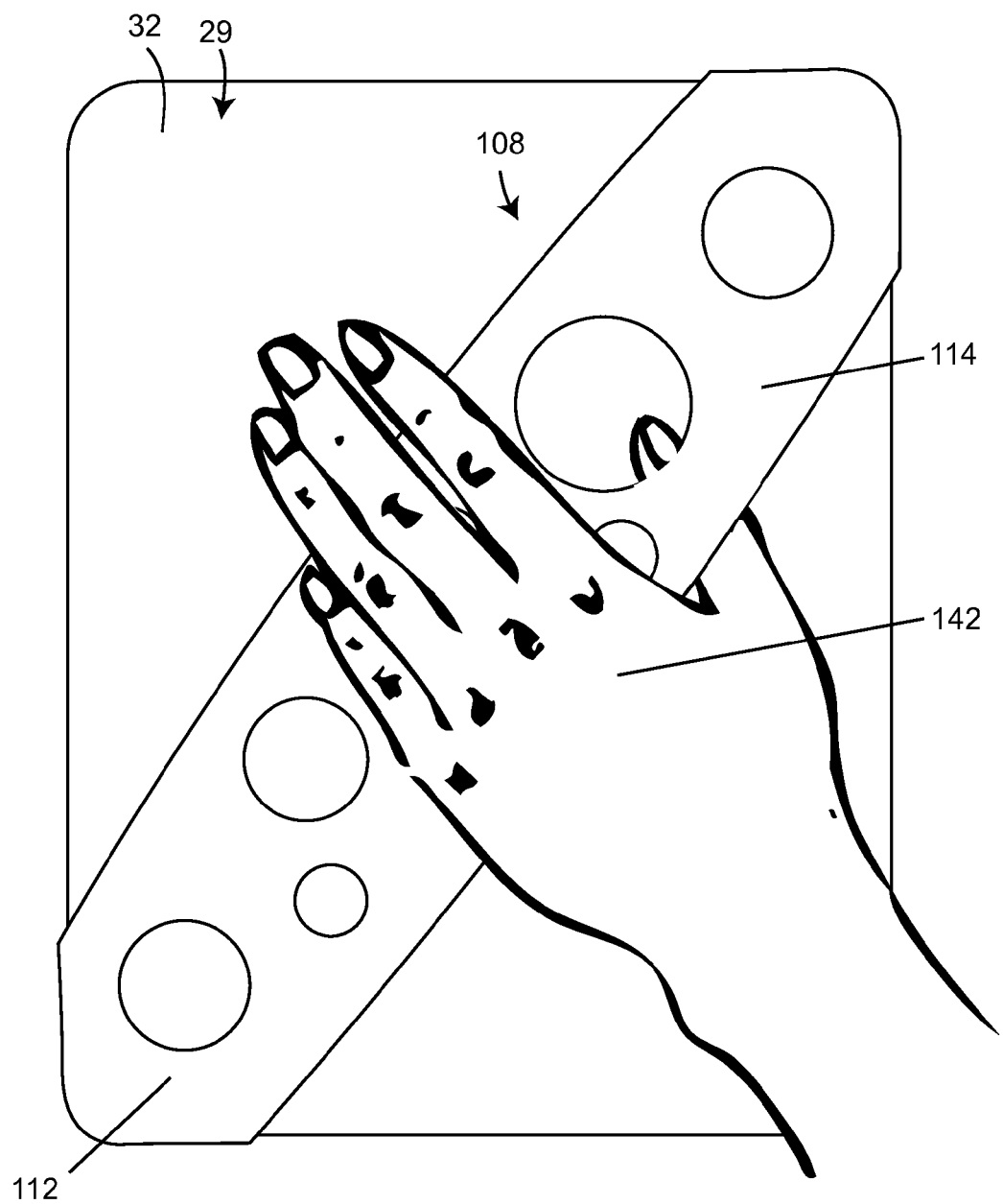
FIG. 17 is the applied device of FIG. 16 showing the device engaged with a user's hand.

As shown in FIG. 17, the central portion 114 of the device that rests on the back surface 29 of the tablet 32 represents an area by which a user can support the tablet 32 by employing various hand and finger positions of the user's hand 142. The user can slide his/her hand 142 under the device 108 so that the second surface 105 is in contact with a back surface of the user's hand. In addition, the user can thread one or more fingers through the holes 120 in the device 108 for various gripping positions.

Figure 18:
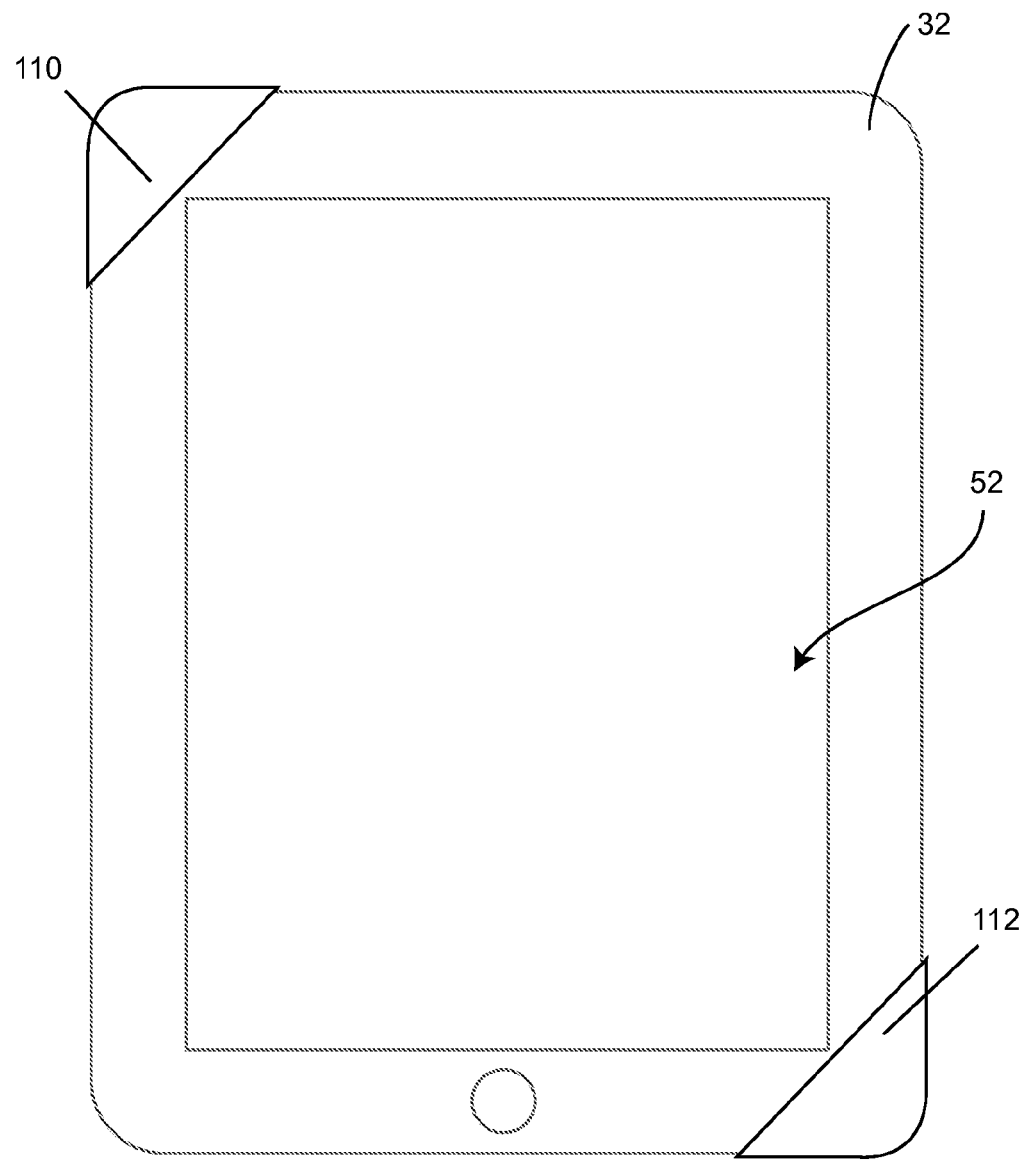
FIG. 18 is a front view of the tablet of FIG. 13 having end segments of the device engaged with a front surface of the tablet.

In FIG. 18, first and second pockets 110, 112 anchor the device 108 on the tablet 32 and act as two front "bumpers" which serve to protect the front surface 52 of the tablet 32 when placed face down. The pockets 110, 112 also serve as an alternative method for holding the tablet 32 without interfering with the front active surface from the front side when griped by one's thumb from the front.

The device 108 having the pockets 110, 112 is more difficult to manufacture than the devices that can be manufactured in a relatively flat two-dimensional mold, such as the devices 30, 68 discussed above. The device 108 is formed from a material that has some expandability or stretchability, but the device 108 does not expand like the devices 30, 68 having the first and second ends.

Figure 19:
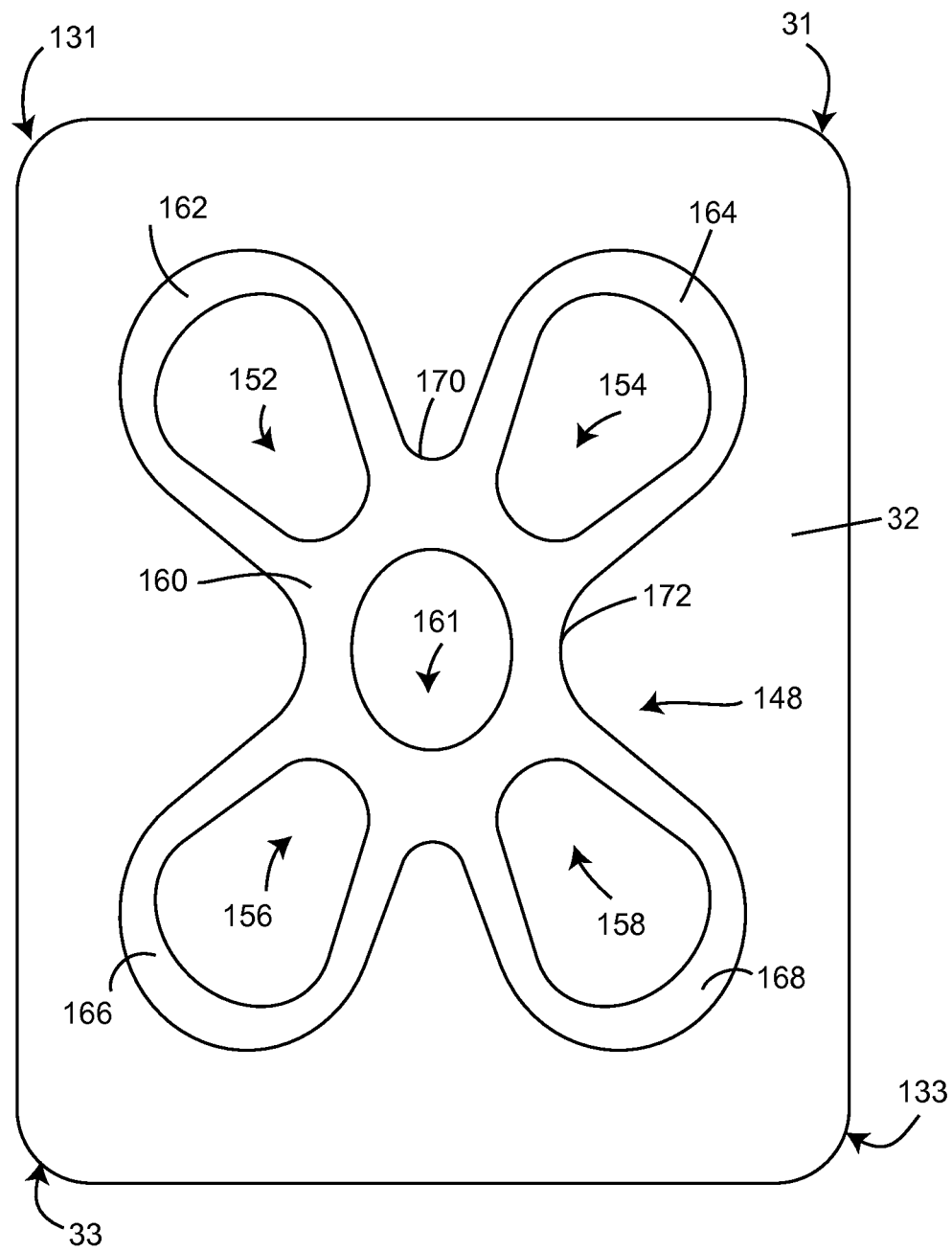
FIG. 19 is a top view of an alternative embodiment of a tablet support device resting on a back surface of a tablet in a disengaged configuration in accordance with the present disclosure.

FIGS. 19-24 are views of an alternative embodiment of the present disclosure that can be attached to all four corners of the tablet 32. As shown in FIG. 19, a protective support device 148 consists of a flat piece of elastomeric material with its outer most dimensions smaller than dimension of the back surface of the tablet to which it is to be applied. There are four distinct corner openings 152, 154, 156, 158 of the device 148. These openings are designed to attach over the four corners 131, 31, 33, 133, of the tablet 32 when stretched, respectively. There is a smaller single opening 161 in a center portion 160, which is designed to serve as various hand and fingers grips when the device 148 is secured to the tablet 32. In other embodiments, there may be more than one opening in the center portion 160.

The device 148 is a unitary elastomeric material having a first end segment 162 associated with the first opening 152, a second end segment 164 associated with the second opening 154, a third end segment 166 associated with the third opening 156, and a fourth end segment 168 associated with the fourth opening 158. The device 148 may be applied to the tablet 32 by attaching two, three, or all four of the end segments over the respective corners. For example, in one application the first end segment 162 is placed over the corner 131 and the fourth end segment 168 is placed over the opposing corner 133. In an alternate application, the first end segment 162 is placed over the corner 131, the fourth end segment 168 is placed over the opposing corner 133, and the second end segment 164 is placed over the corner 31. The end segments that are not attached to the corners of the tablets 32 may be gripped with the opening 161 to securely hold the tablet 32.

FIGS. 20A-20C are side and top down views of the device 148. FIG. 20A is a side view of the first and second end segments 162, 164, which are connected at point 170. FIG. 20B is a side view of the second and fourth end segments 164, 168, which are connected at point 172. FIG. 20C is a top down view of the device 148. The device 148 has a first dimension 174 from the second end segment 164 to the fourth end segment 168. The device 148 has a second dimension 176 from the third end segment 166 to the fourth end segment 168. The first dimension 174 is larger than the second dimension 176 and corresponds to the dimensions of the tablet.

FIGS. 20A-20C reveals that the end segments 162, 164, 166, 168 of the device 148 are rounded. The same is true of the inner edges of the opening 161 of the center portion 160, finger holds. In one embodiment, the device 148 is symmetrical. In an alternative embodiment, the openings 152, 154, 156, 158 may have irregular shaped openings that may all be different or the same.

Figure 21:
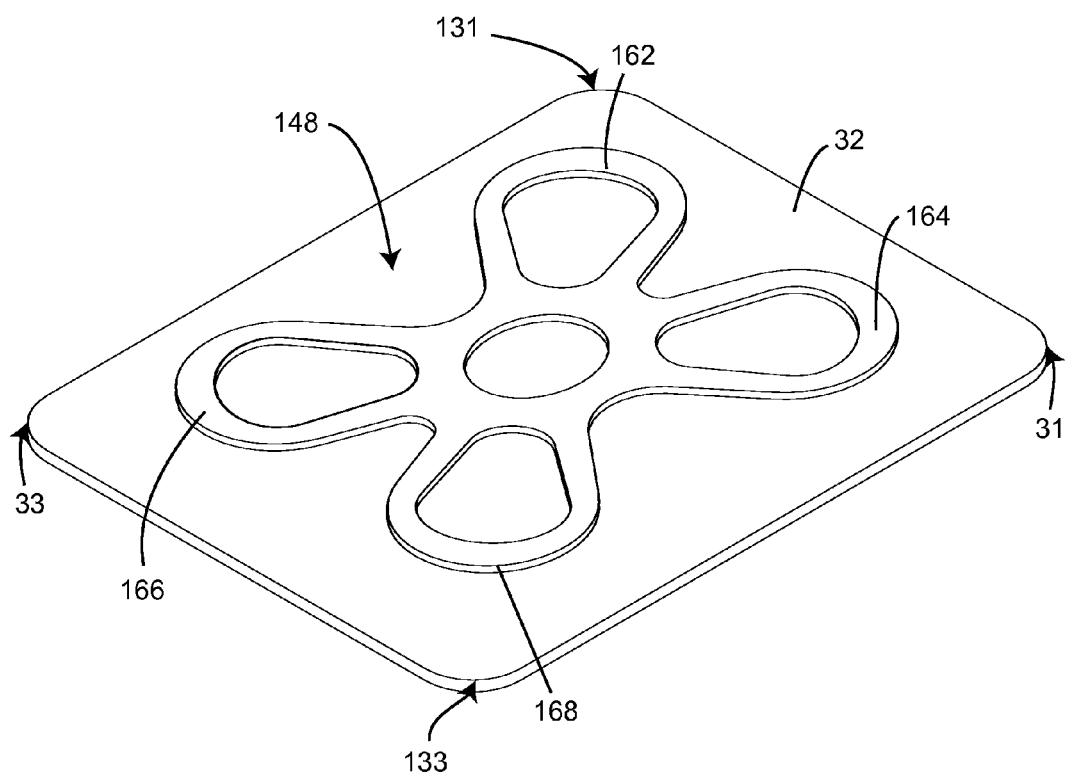
FIG. 21 is a perspective view of the device of FIG. 19, relative to the tablet, prior to being engaged with the tablet.
Figure 22:
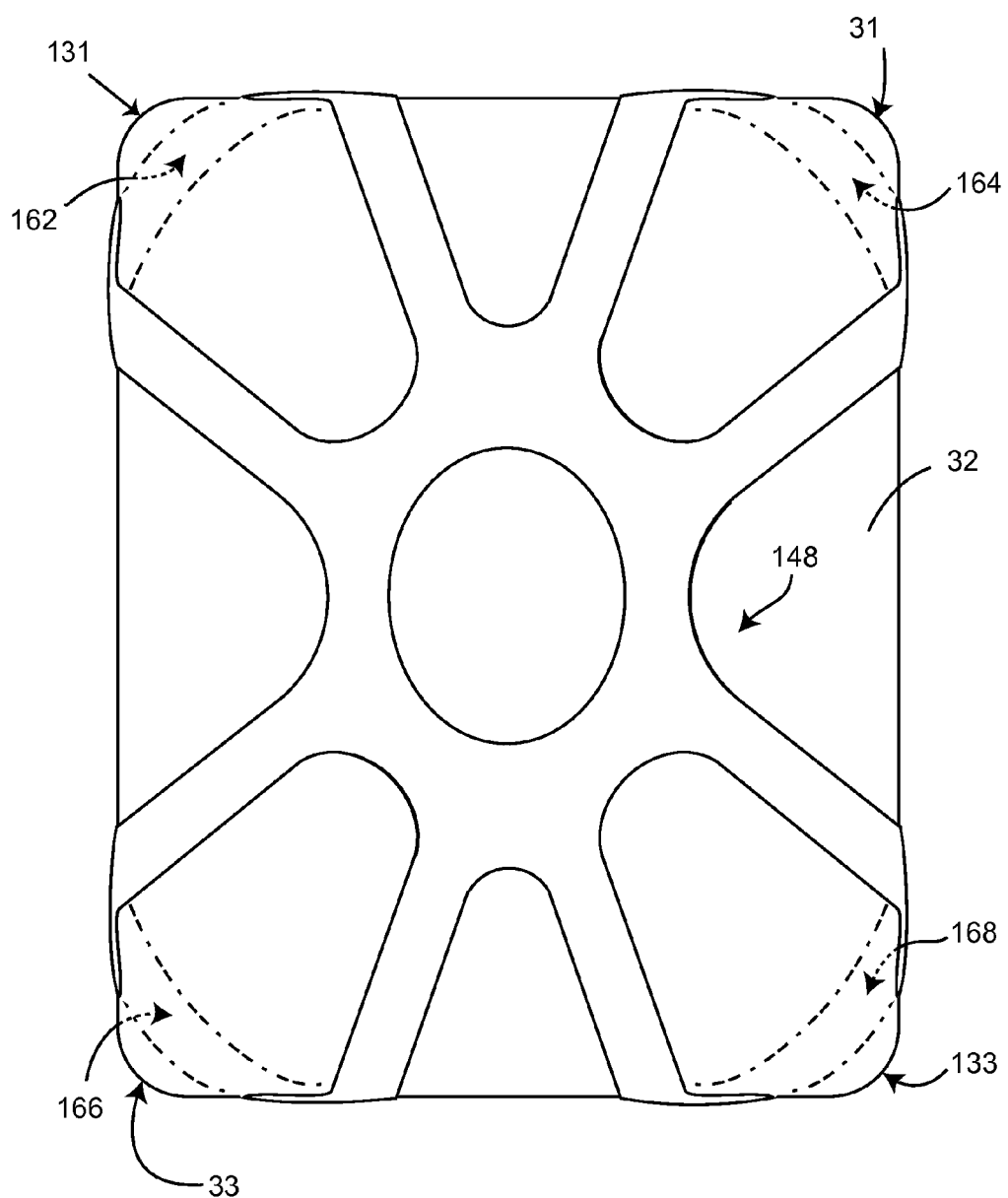
FIG. 22 is a back view of the tablet having the device of FIG. 19 applied over the back surface.

FIG. 21 is a perspective view of the device 148 prior to application on the tablet 32. FIG. 22 illustrates how the device 148 is applied to the tablet 32. When slipped and secured over the four corners of the tablet, 131, 31, 33, 133 these end segments 162, 164, 166, 168 form a secure grip on the front corners of the tablet 32. These end segments 162, 164, 166, 168 also protect the front surface of the tablet 32 by forming the bumpers described above. These bumpers are equal to the thickness of the end segments and create a space between the front surface of the tablet and a surface on which the tablet is placed.

Figure 23:
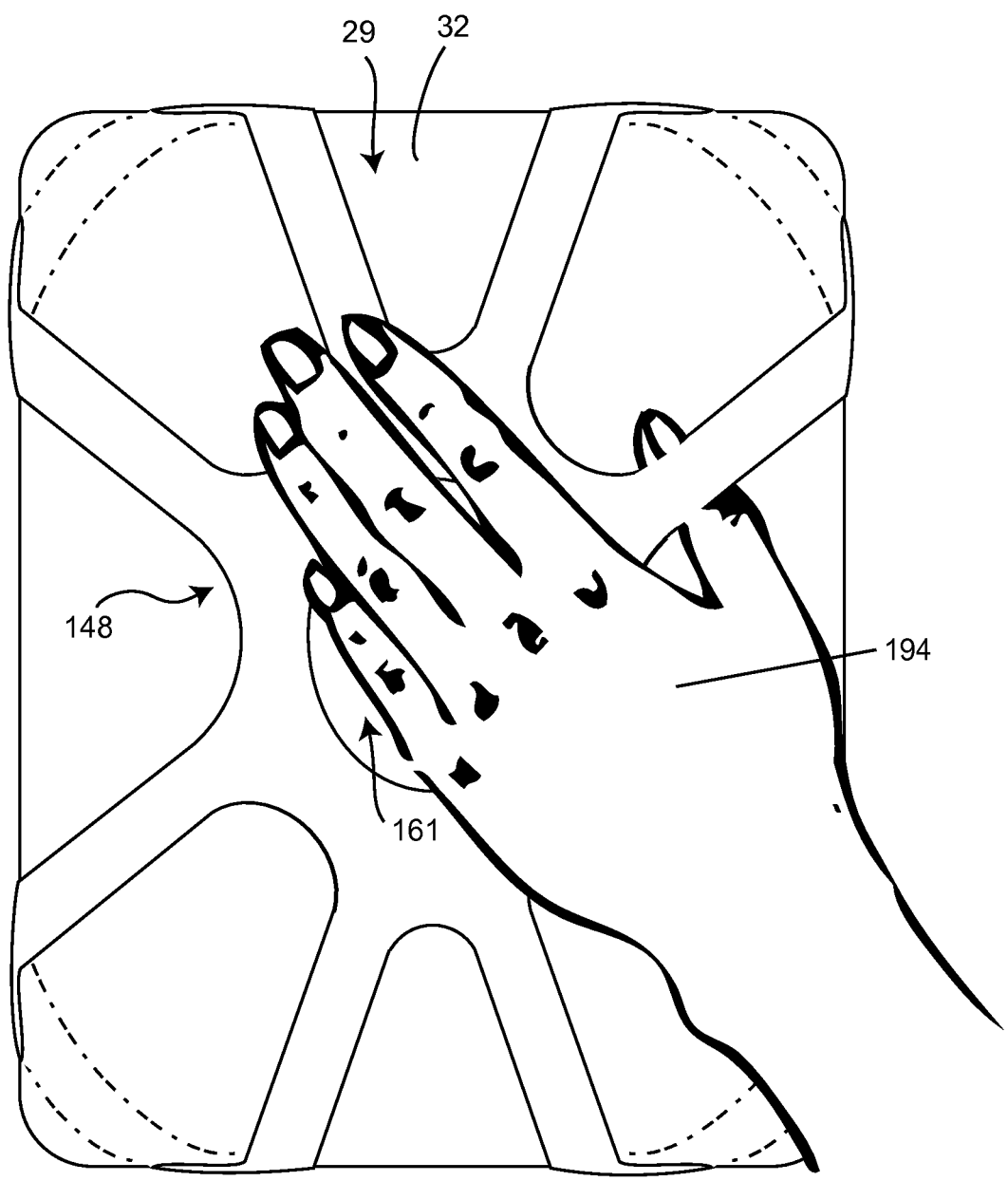
FIG. 23 is the applied device of FIG. 22 showing the device engaged with a user's hand.

The area of the device 148 that rests on the back surface 29 of the tablet 32 represents a surface by which a user supports the tablet 32 by employing various hand and finger positions as shown in FIG. 23. The user's entire hand 194 could be slid under the center portion 160 to pull the back surface 29 of the tablet into the user's palm. Alternatively, the user could slide some of one or more of his/her fingers through the center opening 161. The user can also wrap one's fingers around the stretched end segments 162, 164, 166, 168 to support the tablet 32 by the device 148.

Figure 24:
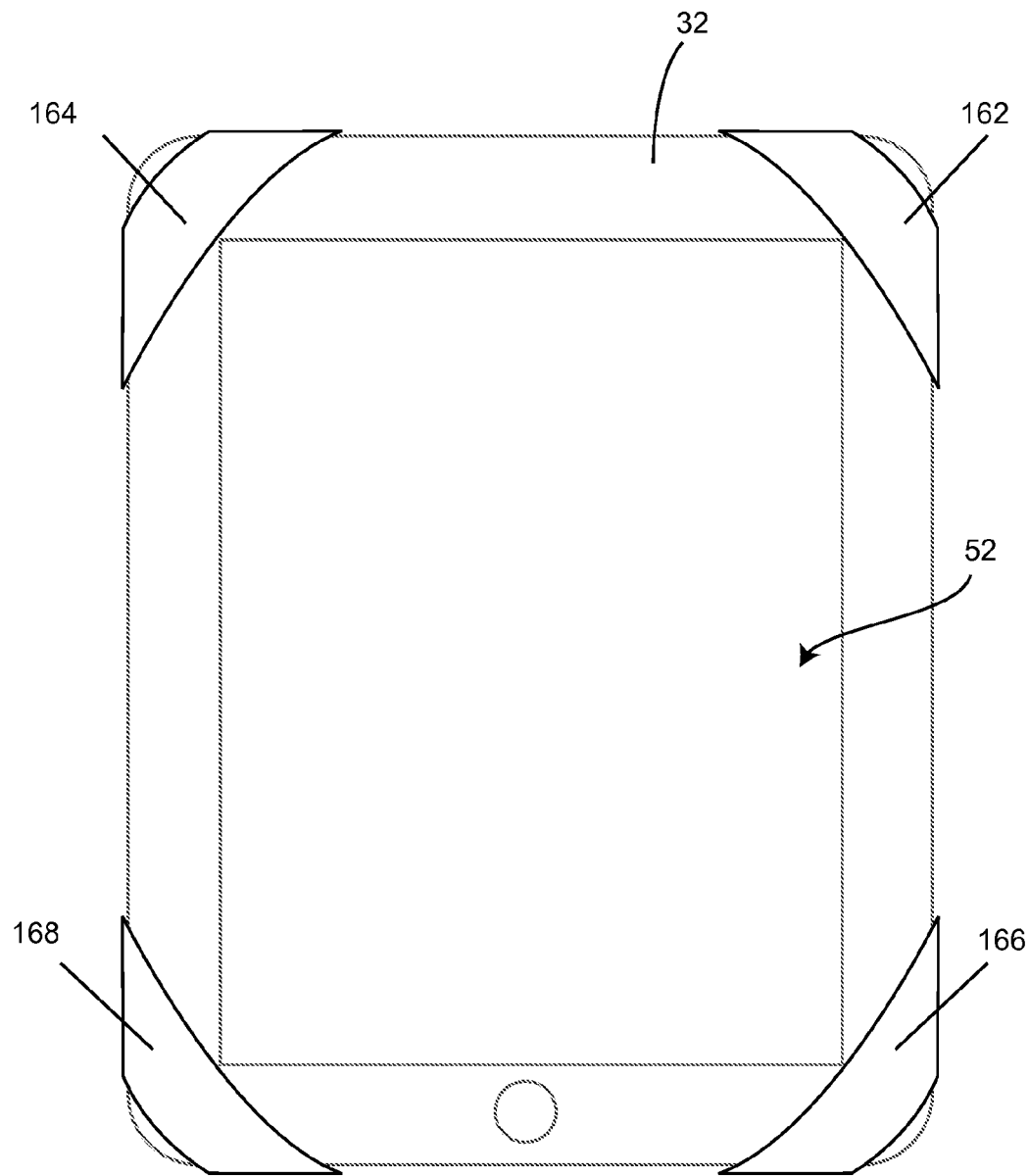
FIG. 24 is a front view of the tablet of FIG. 19 having end segments of the device engaged with a front surface of the tablet.

In FIG. 24, the end segments 162, 164, 166, 168 of the device 148, in addition to anchoring the device 148 on the tablet 32, also act as front "bumpers" which serve to protect the front surface 52 of the tablet 32 when placed face down. These bumpers also serve as "purchase points" providing an alternative method for holding the tablet 32 from its front side when griped between the thumb and forefinger.

Figure 25:
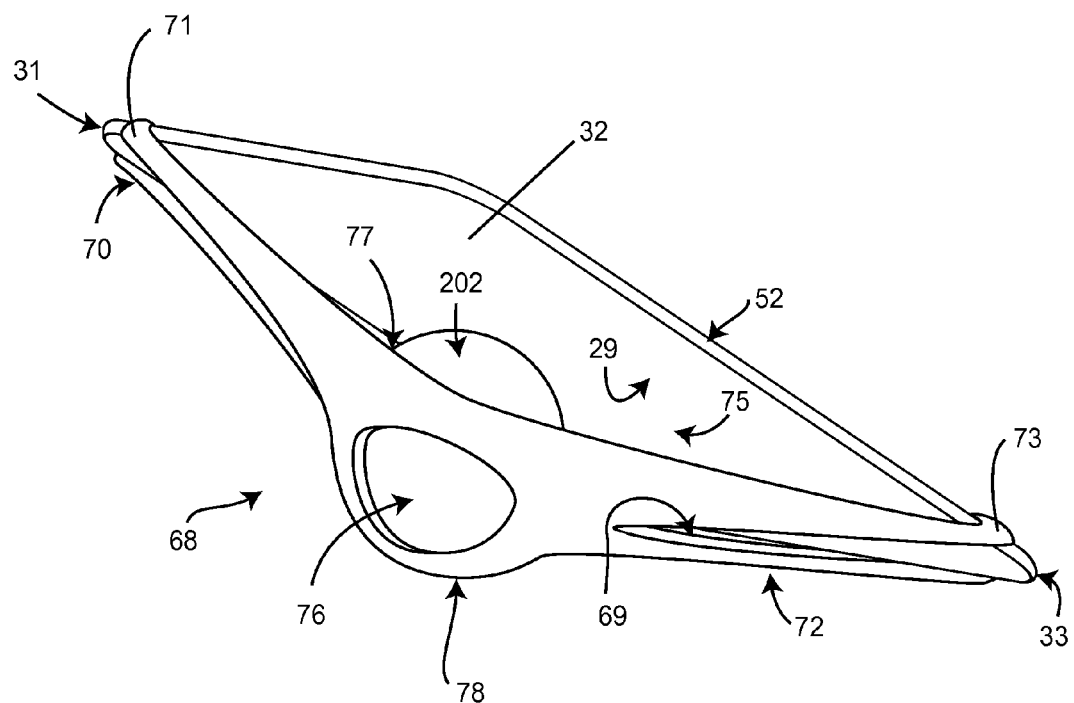
FIG. 25 is a side view of the device of FIG. 7 attached to the tablet and configured to provide an angled support for the tablet.

FIG. 25 is a side view of the protective support device 68 from FIG. 7 that is providing an angled support for viewing the front active surface 52 of the tablet 32. The first and second end segments 71, 73 of the device 68 are engaged with the corners 31, 33 of the tablet 32. An item 202 separates the back surface 29 of the tablet 32 from the second surface 69 of the device 68. The first surface 78 of the device 68 could rest against a table or other hard surface. Together the device 68 and the item 202 provide the angled support for the tablet 32.

The dimensions and qualities of the item 202 will change the angle of the tablet 32. Ordinary household items may be used as the item 202, which allows the user flexibility in the angle of viewing by simply using an easily accessible item. For example, a round item like a tennis ball, an orange, or a pair of socks may be used for the item. However, other non-round items may also be used.

The tablet 32 may be viewed in a horizontal or vertical configuration depending on the shape and position of the item 202. The configuration of the device 68 will also impact the type of item that can be inserted to create the angled support. Any of the embodiments of devices described herein may be used with an item to form the angled support.

In FIGS. 26A-26C, yet another embodiment of a protective support device 300 is provided in accordance with the present disclosure. The support device 300 has a circular perimeter 302 and includes a central member 304 that separates a first and a second opening 306, 308, respectively. The first and second openings 306, 308 are delimited by first and second curved ends 310, 312, respectively. The first and second curved ends 310, 312 are joined at first and second connection points 314, 316. The central member 304 extends between the first and second connection points 314, 316.

In this embodiment, the central member 304 and the first and second curved ends have a consistent dimensions 320, 318 throughout. The central member 304 with the first and second curved ends 310, 312 form the first and second openings 306, 308 having a semi-circular shape. However, the shape is cosmetic and other shapes may be utilized. The shape of the first and second openings 306, 308 may be varied by changing the shape or dimensions of the central member 304. For example, the central member may vary in thickness from one connection point to the other. In addition, the central member 304 may not be straight and may be instead have a curvilinear configuration. The shape of the first and second openings 306, 308 may also be varied by changing the dimensions of the first and second curved ends 310, 312.

The first and second curved ends 310, 312 have a first dimension, shown by dimension line 318, and a second dimension, shown by dimension line 320, of the central member 304. Although the second dimension 320 of the central member 304 is a consistent thickness between the connection points 314, 316, in other embodiments the central member 304 may vary in size between the connection points. Alternatively, the second dimension may be larger than the first dimension. The difference in the dimensions impacts the expandability of the first and second ends 310, 312 as compared to the central member 304.

The device 300 also includes a third dimension 322, which is a thickness of the device 300. This third dimension 322 provides a raised edge when applied to the tablet 32 to protect the front surface 52 from damage when placed on a hard surface. The device 300 includes a fourth dimension 324 that is the diameter of the circular perimeter 302 taken from the external most edges of the device 300.

When applied to the tablet 32, the connection points 314, 316 of the device 300 move towards each other as the first and second ends 310, 312 are stretched over the corners 31, 33 of the tablet 32. The movement of the connection points 314, 316 towards each other creates a handle or raised member (not shown) from the central member 304 that the user can utilize to hold or support the tablet 32.

The devices described herein may be formed from a unitary elastomeric material of a certain size and elasticity such that the device, when stretched, can be attached to the two or more opposing corners of a variety of objects. No single material is prescribed but, instead, the device utilizes materials known to those skilled in the art. Whether silicone, rubber, or some other substance is used, the properties of the material can be varied depending upon the size and shape of the device relative to the object to which it is to be applied. The only requirement is that the material, when applied to the object, is of a character that the device is incapable of disengaging from the corners inadvertently and that the material that lays across the back of the object is not so tight as to impede or arrest use with one's hand or fingers or lead to excess fatigue over time.

The device may have asymmetrical features such that the central portion to be gripped by a user is at a position shifted from the center of the tablet. The tension created between the two or four corners results in a tight fit that will not inadvertently disengage from the object 32.

The fact that the object 32 is rectangular in shape enables the device to be attached to opposing corners of the object 32. The dimension of the device, together with its material properties and the design of its openings conspire to create a device that, when attached, results in a secure structure that can be easily gripped by a user's hand and fingers in a wide array of positions.

No single manufacturing process is required to produce the device. Instead it is to be constructed according to manufacturing processes known to those skilled in the art. It is significant, however, that certain embodiments, such as those depicted in FIGS. 1, 7, 19, and 26 are designed so that they can be made by a simple two-dimensional mold. By being able to produce a complete device from a unitary piece of silicone from a two-dimensional mold creates manufacturing and economic advantages, not only to the tool making costs but also in the production costs. The device produced from such a two-dimensional mold is finished and requires no additional components or assembly.

No particular thickness of the device is required. The thickness of the device can vary depending upon the type of material used and the desired characteristics. Although the thickness of the device can be varied, it has been observed that 3.5 mm provides a comfortable weight that creates an impression of confidence. No particular shape is prescribed for the device, but embodiments in FIGS. 1-12 and 26 are designed with two wide circular or curved openings to afford maximum security in addition to ease of attachment and detachment.

The invention claimed is:

1. A protective support device, comprising:
 a planar unitary elastomeric body that is flat throughout and includes:
  an elongate, flat central portion having first and second mutually opposing flat surfaces and first and second opposing longitudinal ends, each longitudinal end comprising a transverse band of elastomeric material; and
  at least two flat end segments, each end segment directly connected to and extending from a respective longitudinal end of the central portion and lying in a same plane as the elongate, flat central portion, and each end segment having an opening formed therein, each opening defined by compliant material structured to stretch to engage with opposing diagonal corners of an object and to contract to stay in engagement with the object, the central portion, each end segment, and each opening further sized and shaped to position the central portion diagonally across the object and to cause a segment of the transverse band of material at each longitudinal end to project out of the plane of the elongate, flat central portion and away from the object when each opening is engaged with the respective corner of the object.

2. The protective support device of claim 1 wherein the body is structured to hold the first flat surface of the central portion against the object in response to engagement with the respective diagonal corners of the object.

3. The protective support device of claim 1 wherein the elastomeric body is formed from a silicone elastomer material.

4. The protective support device of claim 3 wherein the silicone elastomer material has a tensile strength in the range of 7 and 8 megapascals.

5. The protective support device of claim 2 wherein each end segment is configured to form a protective bumper for opposing surfaces of the object in response to engagement at the respective corner of the object.

6. The protective support device of claim 5 wherein the body is configured to expand and contract between an engaged configuration in which the at least two end segments are engaged with the opposing corners of the object and a disengaged configuration in which the at least two end segments are not engaged with the respective opposing corners of the object, the body further configured to urge the object against the user's hand and hold the object against the user's hand when the user's hand is inserted between the body and the object.

7. The protective support device of claim 6 wherein the first surface is configured to extend over a display of the object and to engage with a back surface of the object in the engaged configuration.

8. The protective support device of claim 6 wherein the first surface in the engaged configuration is in contact with a display of the object at an apex of each of the at least two end segments, and the first surface is in contact with a back surface of the object at the central portion of the device.

9. A protective support device for an object having a first corner and a second corner diagonal to the first corner, and a front surface and a back surface, the device comprising:
 a flat elastomeric body lying in a plane and formed from a compliant material, the body including:
 a flat central member lying in the plane;
 a first flat curved end lying in the plane and extending between a first connection and a second connection on the central member, the first curved end configured to engage with the first corner of the object, the first curved end delimiting a portion of a first opening;
 a second flat curved end lying in the plane and extending between the first connection and the second connection and in a direction opposite a direction of the first flat curved end, the second curved end configured to engage with the second corner of the object, the second curved end delimiting a portion of a second opening; and
 the central member, the first curved end, and the second curved end configured to cooperate to urge the central member to stand up away from the object in response to the first and second curved ends engaging the respective diagonal first and second corners of the object.

10. The device of claim 9 wherein the body further includes: a second flat central member lying in the plane adjacent to the first central member and extending between the first connection and the second connection, the first and second central members delimiting a third opening; the first curved end and the first central member configured to delimit the first opening; and the second curved end and the second central member configured to delimit the second opening.

11. The device of claim 9 wherein the first and second curved ends have a first elasticity and the first and second connections have a second elasticity, the first elasticity is configured to enable the first and second curved ends to stretch and engage with the first and second corners of the tablet computer, and the second elasticity is less than the first elasticity.

12. A device for use with an object having a first corner and a second corner diagonal to the first corner and opposing first and second flat surfaces, comprising:
 a single, flat, elongate elastomeric body lying in a plane and having flat, mutually opposing first and second surfaces, the body configured to stretch to an engaged configuration on the object to retract from the engaged configuration to a disengaged configuration, the body including:
 a central member having first and second transverse bands;
 a first end directly attached to only the central member and extending from the central member in a first direction and in the plane, the first end having a first opening sized and shaped to stretch over and engage the first corner;
 a second end directly attached to only the central member and extending from the central member in a second direction opposite to the first direction and in the plane, the second end having a second opening sized and shaped to engage the second corner and hold the central member diagonally across the first surface of the object and against the first surface of the object; and the central member, the first end, and the second end cooperating to urge the first and second transverse bands to stand up away from the object in response to the engagement of the first and second openings with the first and second corners of the object.

13. The device of claim 12 wherein the central member is configured to urge the object against the user's hand and hold the object against the user's hand when the user's hand is inserted between the body and the object.

14. The device of claim 12 wherein in the engaged configuration each of the first and second ends is configured to form a protective bumper for the opposing first and second surfaces of the object in the engaged configuration.

15. The device of claim 12, wherein the first end is attached to the first transverse band and the second end is attached to the second transverse band.

\* \* \* \* \*